(12) United States Patent
Kitajima et al.

(10) Patent No.: US 7,234,660 B2
(45) Date of Patent: Jun. 26, 2007

(54) SPINNING REEL ROTOR BRAKING DEVICE

(75) Inventors: Keigo Kitajima, Sakai (JP); Hirokazu Hiraoka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/506,823

(22) Filed: Aug. 21, 2006

(65) Prior Publication Data
US 2007/0057104 A1    Mar. 15, 2007

(30) Foreign Application Priority Data

Sep. 7, 2005  (JP) ............................. 2005-258863
Jul. 28, 2006  (JP) ............................. 2006-205895

(51) Int. Cl.
A01K 89/01  (2006.01)

(52) U.S. Cl. .................................... 242/247

(58) Field of Classification Search ............... 242/231, 242/232, 247, 248
See application file for complete search history.

(56) References Cited

U.S. PATENT DOCUMENTS 3,586,255 A    6/1971  Monthulet 5,820,051 A *  10/1998  Takeuchi et al. ............. 242/232
6,382,542 B1 *  5/2002  Sato ............................ 242/243
6,971,599 B2 * 12/2005  Sugawara .................... 242/231

FOREIGN PATENT DOCUMENTS

| EP | 1516531 A2 | 3/2005 |
| JP | 10-004839 A | 1/1998 |
| JP | 2003-189767 A | 7/2003 |
| JP | 2004-141144 A | 5/2004 |

* cited by examiner

Primary Examiner—Emmanuel M Marcelo
(74) Attorney, Agent, or Firm—Global IP Counselors, LLP

(57) ABSTRACT

A braking member includes a body member and first and second interposed members. The first and second interposed members are detachably/reattachably mounted between a mounting groove and the body member. A braking force of the braking member is configured to be adjusted by attaching/detaching first and second projection members to/from first and second concave portions that are formed in a mounting groove so that the first and second projection members can contact the inner peripheral sides of the first and second interposed members.

20 Claims, 20 Drawing Sheets

SPINNING REEL ROTOR BRAKING DEVICE

CROSS-REFERENCE TO RELATED APPLICATIONS

This application claims priority under 35 U.S.C. § 119 to Japanese Patent Application Nos. 2005-258863 and 2006-205895. The entire disclosures of Japanese Patent Application Nos. 2005-258863 and 2006-205895 are hereby incorporated herein by reference.

BACKGROUND OF THE INVENTION

1. Field of the Invention

The present invention generally relates to a rotor braking device. More specifically, the present invention relates to a spinning reel rotor braking device that brakes a rotor in response to pivoting a bail arm.

2. Background Information

A rotor on a spinning reel is generally provided with a bail arm for guiding a fishing line to a spool. The bail arm can assume a line-winding position, in which the fishing line is guided to an outer periphery of the spool when winding up the fishing line, and a line-releasing position, in which the bail arm is toppled over from the line-winding position so that it does not pose a hindrance when the fishing line is rolled off from the spool. The rotor is provided with a bail tripping device, which maintains the bail arm in the line-winding position and the line-releasing position. The bail tripping device returns the bail arm from the line-releasing position to the line-winding position in cooperation with a rotation of the rotor in a line-winding direction. (See, for example, Japanese Unexamined Patent Publication No. H10-004839.)

The bail tripping device includes a toggle spring, a rod-shaped moving member and a switching protrusion. The toggle spring is mounted to the rotor. The toggle spring has a front end that is interlocked adjacent a pivot center of the bail arm. The rod-shaped moving member has a front end that is interlocked adjacent the pivot center of the bail arm and a base end that moves forward and backward with respect to the reel unit. The switching protrusion is provided on the reel unit so as to contact the moving member. The toggle spring toggles and urges the bail arm between two positions and maintains the bail arm in the two positions. When the bail arm is pivoted into the line-releasing position, the moving member retreats to a position in which it contacts the switching projection. Then, when the rotor rotates in the line-winding direction, the rotor contacts the switching projection and pushes it forward. The toggle spring contracts due to this forward advancement. The toggle spring then returns the bail arm to the line-winding position.

A spinning reel having improved rotational transmission efficiency can be rotated easily in the line-winding direction. When the rotor rotates, the rotational orientation thereof tends to shift easily, even when the rotor has been rotated into a rotational orientation suitable for casting or thumbing.

In the aforementioned conventional configuration, a braking member that contacts the reel unit and brakes the rotor is mounted on the moving member so as to prevent the rotation of the rotor in the line-releasing position. When the moving member is moved into the contact position, the braking member contacts the front surface of the reel unit and is compressed, thereby braking the rotor. When the rotor is elastically braked when the bail is tripped, the rotor can be prevented from rotating and can also be rotated in the line-winding direction when necessary.

In this configuration, the braking member mounted on the moving member comes into contact with the reel unit and is compressed, thus braking the rotor. Therefore, if the contact position of the moving member varies back and forth due to manufacturing errors or assembly errors, the amount of compression of the braking member will change as well. If the amount of compression changes, the braking force on the rotor will also change and thus, the rotor cannot be braked reliably. Accordingly, a bail tripping device has been known to use an annular braking member made of an elastic synthetic resin mounted onto the reel unit. The moving member is moved in a direction perpendicular to the compression direction of the braking member from the end of the braking member towards an outer peripheral surface and thereby brought into contact with the braking member. (See, for example, Japanese Unexamined Patent Publication No. 2003-189767.)

However, there are concerns that this configuration will produce irregularities in the braking force and make the braking force unstable because braking would occur on only one portion in which the moving member contacts the braking member. If the braking force becomes unstable like this, there are concerns that a consistent amount of braking force will not be produced, which in turn will give rise to a decrease in operability.

To solve this problem, a rotor braking device has been known which includes an annular drag portion that is made of an elastic synthetic resin and frictionally engages with the reel unit so as to rotate relative thereto. The rotor braking device further includes a braking member that has a plurality of engaging portions with which a protrusion on the moving member engages so that the drag portion can frictionally slide with the reel unit when the protrusion on the moving member engages with the engaging portions. (See, for example, Japanese Unexamined Patent Publication No. 2004-141144.)

This type of braking member is an annular member that is made of an elastic synthetic resin and comprised of two approximately semi-circular members. The drag portion thereof is press-contacted to the reel unit by a spring member mounted on an annular groove that is formed on the outer periphery of the lateral side of the reel unit so that the drag portion can frictionally slide with the reel unit, for example. A whole inner peripheral surface of the drag portion can contact a mounting groove formed on the outer periphery of the front end of the reel unit. With this configuration, the braking force is stabilized because the rotor is uniformly braked by the entire drag portion.

The braking force is stabilized by the rotor braking device, which the drag portion frictionally engages, because the rotor is uniformly braked over the entire drag portion. The braking force of this drag portion is determined by a kind of elastic synthetic resin and the pressure-contact force of a spring member. In the conventional configuration, the kind of elastic synthetic resin and the pressure-contact force of the spring member are configured to be preset when the rotor braking device is assembled. Therefore, there is no option but to change all the components in order to change the braking force. Accordingly, it is difficult to easily change the braking force.

In view of the above, it will be apparent to those skilled in the art from this disclosure that there exists a need for an improved rotor braking device with a braking force that is easily adjusted. This invention addresses this need in the art as well as other needs, which will become apparent to those skilled in the art from this disclosure.

SUMMARY OF THE INVENTION

A rotor braking device of a spinning reel according to a first aspect of the present invention brakes a rotor that is rotatably mounted on a reel unit according to a pivot of a bail arm that pivots between a line-winding position and a line-releasing position. The rotor braking device includes a moving member, a braking member and a frictional force adjusting unit. The moving member is configured to be mounted in the rotor to move to a first position corresponding to the line-winding position and to a second position corresponding to the line-releasing position in association with the bail arm. The braking member includes an annular body member, a drag portion and a plurality of engaging portions. The annular body member is configured to be mounted on an outer periphery of a front end of the reel unit. The drag portion is formed in an inner peripheral side of the body member and configured to frictionally engage the reel unit to rotate relative thereto. The engaging portions are formed in an outer peripheral side of the body member. The moving member engages one of the engaging portions when the moving member is moved to the second position. The braking member frictionally slides the drag portion with respect to the reel unit when the moving member engages with the engaging portions. The frictional force adjusting unit is configured to be disposed between the reel unit and the braking member and to change a frictional force generated when the drag portion frictionally slides with respect to the reel unit.

The frictional force adjusting unit is disposed between the reel unit and the braking member. The frictional force adjusting unit adjusts the frictional force generated when the drag portion frictionally slides with the reel unit. Therefore, it is not necessary to change the whole components in order to adjust the braking force of the rotor braking device of the present invention as is required in the conventional rotor braking device. Accordingly, it is possible to easily adjust the braking force of the rotor braking device of the present invention.

A rotor braking device in accordance with a second aspect of the present invention is the rotor braking device according to the first aspect of the present invention, wherein the braking member is comprised of an annular synthetic resin with elasticity, and the drag portion is mounted on the reel unit to be press-contacted thereto by the elasticity of the synthetic resin. In this configuration, it becomes easy for the braking member to be attached/detached to/from the reel unit, and it is possible to easily obtain the braking force by the elasticity of the elastic member.

A rotor braking device in accordance with a third aspect of the present invention is the rotor braking device according to the first aspect of the present invention, wherein the braking member includes two approximately semi-circular synthetic resin members, and the drag portion is mounted to the reel unit to be press-contacted thereto by a spring member mounted in an annular groove that is formed in an outer periphery side of the body portion. In this configuration, it is possible to easily obtain the braking force because the spring member is inserted into the groove formed on the outer periphery of the braking member. Thus, the braking member is press-contacted to the reel unit.

A rotor braking device in accordance with a fourth aspect of the present invention is the rotor braking device according to one of the first through third aspects of the invention, wherein the frictional force adjusting unit adjusts the amount of the fictional force generated when the drag portion is frictionally slid with the reel unit by changing relative positions of the reel unit and the braking member. In this configuration, it is possible to easily adjust the braking force only by changing the relative position of the braking member with respect to the reel unit.

A rotor braking device in accordance with a fifth aspect of the present invention is the rotor braking device according to the fourth aspect of the present invention, wherein the frictional force adjusting unit includes a concave portion that is formed by concaving an outer periphery of a front end portion of the reel unit, and a projection member, a front end portion of which is mounted on the concave portion to project outward, and which adjusts the frictional force generated when the front end portion contacts an inner peripheral side of the braking member and then the drag portion is frictionally slid with the reel unit. In this configuration, it is possible to easily adjust the braking force because the projection members with the different amount of projection can be used and the projection member can be attached/detached to/from the concave portion.

A rotor braking device in accordance with a sixth aspect of the present invention is the rotor braking device according to a fifth aspect of the present invention, wherein the projection member is detachably/reattachably mounted on the concave portion. In this configuration, not only manufacturers of the reel but also anglers who use the reel can attach/detach the projection member to/from the concave portion. Therefore, it is possible for the anglers to adjust the braking force easily.

A rotor braking device in accordance with a seventh aspect of the present invention is the rotor braking device according to one of the fifth and sixth aspects of the present invention, wherein the projection member includes a male threaded portion that can be screwed into a female threaded portion formed in the concave member. In this configuration, it is possible to easily change the amount of projection of the projection member because the male threaded portion can be screwed into the female threaded portion.

A rotor braking device in accordance with an eighth aspect of the present invention is the rotor braking device according to one of the fifth and sixth aspects of the present invention, wherein the frictional force adjusting unit further comprises a pushing member that pushes the projection member toward an inner peripheral side of the braking member. In this configuration, it is possible to easily adjust the pushing force generated when the pushing member pushes the projection member if a male thread, which is disposed so that the front end portion thereof can contact the base end portion of the projection member and has a male threaded portion that is able to be screwed into the female threaded portion formed in the concave portion, is screwed into the female threaded portion. Therefore, it is possible to easily adjust the amount of projection of the projection member.

A rotor braking device in accordance with a ninth aspect of the present invention is the rotor braking device according to one of the fifth through eighth aspects of the present invention, wherein the frictional force adjusting unit comprises a plurality of the concave portions which are formed by concaving a plurality of portions of an outer periphery of a front end portion of the reel unit and on which a plurality of the projection members can be mounted. In this configuration, it is possible to further minutely adjust the pressure-contact force of the braking member.

A rotor braking device in accordance with a tenth aspect of the present invention is the rotor braking device according to one of the fifth through ninth aspects of the present invention, wherein the frictional force adjusting unit comprises a plurality of the projection members whose amounts of projection of the front end portion thereof from the concave portion are different from each other. In this configuration, it is possible to adjust the pressure-contact force of the braking member according to the amount of projection of the projection member.

A rotor braking device in accordance with an eleventh aspect of the present invention is the rotor braking device according to one of the first through tenth aspects of the present invention, wherein the braking member further comprises an approximately cylindrical synthetic resin interposed member with a small frictional resistance that is detachably/reattachably mounted between the reel unit and the body portion. In this configuration, if the body portion is formed by a synthetic resin such as urethane with the large frictional resistance, it is possible to obtain the proper frictional force by mounting the interposed member comprised of a synthetic resin such as polyamide synthetic resin and polyacetal (POM), which have the frictional resistance smaller than that of the synthetic resin such as urethane, between the reel unit and the body portion.

A rotor braking device in accordance with a twelfth aspect of the present invention is the rotor braking device according to an eleventh aspect of the present invention, wherein the interposed member is comprised of two approximately semi-cylindrical synthetic resin members. In this configuration, it becomes easy for the interposed member to be attached/detached to/from the rotor braking device.

A rotor braking device in accordance with a thirteenth aspect of the present invention is the rotor braking device according to one of the first through twelfth aspects of the present invention, wherein the moving member is made of metal. In this configuration, it is possible to prevent the moving member from deforming because the moving member can be comprised of metal such as stainless alloy.

A rotor braking device in accordance with a fourteenth aspect of the present invention is the rotor braking device according to one of the first through thirteenth aspects of the present invention, wherein the moving member projects a portion thereof toward the reel unit when positioned in the second position and comprises a projection portion that engages with the engaging portion of the braking member. In this configuration, it becomes easy for the moving member to engage with the engaging portion of the braking member because a portion of the moving member protrudes toward the reel unit.

A rotor braking device in accordance with a fifteenth aspect of the present invention is the rotor braking device according to one of the first through fourteenth aspects of the present invention, wherein the moving member is a rod shaped member, a front end of which is bent toward a vicinity of the pivoting center of the bail arm such that it extends along the pivot axis and rotatably engages with the bail arm, a rear end of which is bent toward the rotational axis of the rotor and engages with the rotor to be movable back and forth, and the portion between the front and rear ends of which is disposed such that it extends along the rotational axis of the rotor. In this configuration, it is possible to easily convert the pivoting motion of the bail arm to the back-and-forth motion of the projection portion of the moving member by using a simple configuration.

According to the present invention, the rotor braking device of a spinning reel comprises the frictional force adjusting unit that is disposed between the reel unit and the braking member, and adjusts the amount of the fictional force generated when the drag portion is frictionally slid with the reel unit. Therefore, it is possible to easily adjust the braking force.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
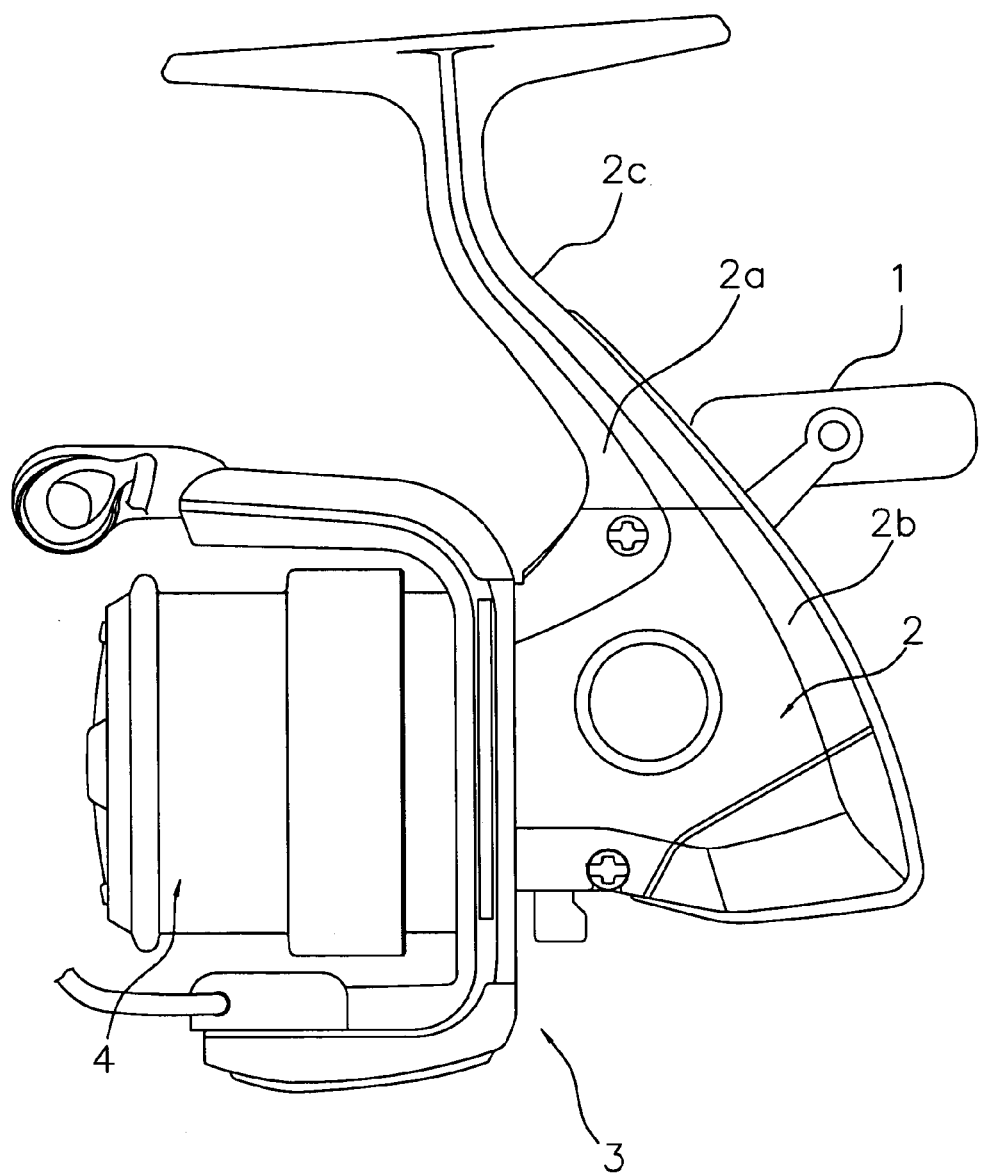
FIG. 1 is a left lateral view of a spinning reel having a rotor braking device in accordance with a first embodiment of the present invention.
Figure 2:
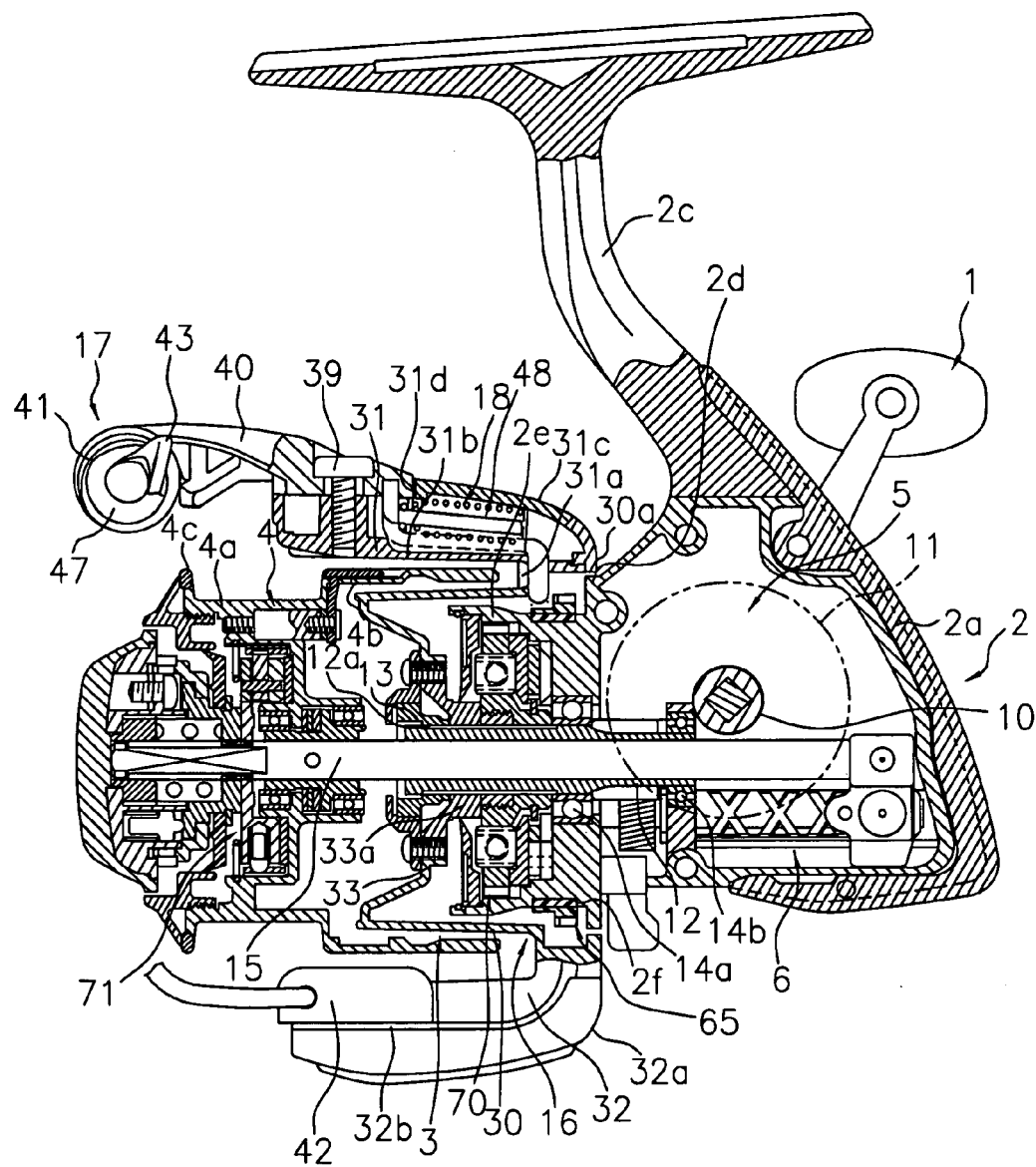
FIG. 2 is a lateral cross-sectional view of the spinning reel of FIG. 1 with the rotor braking device in accordance with a first embodiment of the present invention.

Referring initially to FIGS. 1 and 2, a spinning reel in accordance with a first embodiment of the present invention includes a handle 1, a reel unit 2 that rotatably supports the handle 1, a rotor 3, and a spool 4. The rotor 3 is rotatably supported on a front of the reel unit 2. The spool 4 has a fishing line wound around an outer peripheral surface thereof. The spool 4 is disposed on a front portion of the rotor 3 so that it can move forward and backward. The handle 1 is mounted on a right side of the reel unit 2 in FIGS. 1 and 2. The handle 1 is able to be mounted on either a left or the right side of the reel body 2.

The reel unit 2 includes a reel body 2a, a lid member 2b, a T-shaped rod attachment leg 2c, a circular flange portion 2d and a reel unit cylindrical portion 2e. The reel body 2a has a space in an interior thereof. The lid member 2b is detachably/reattachably mounted from/to the reel body 2a. The lid member 2b serves to enclose the space in the interior of the reel body 2a.

Figure 5:
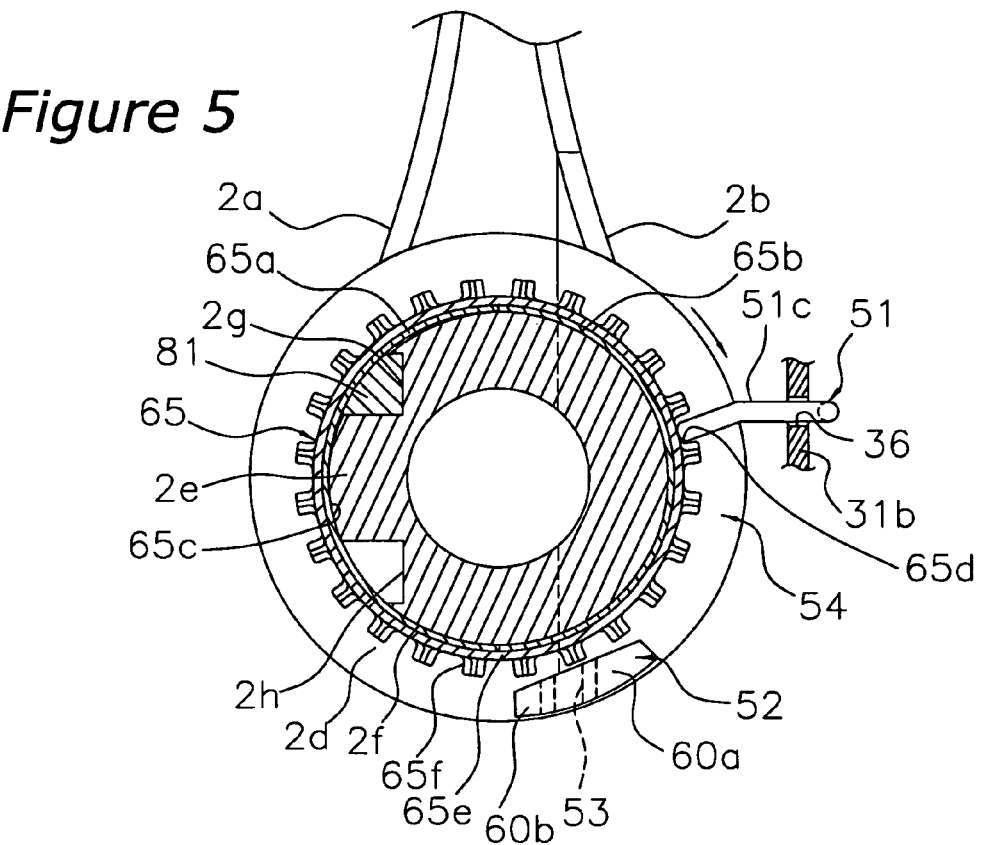
FIG. 5 is a plan view of a reel body of the spinning reel of FIGS. 1 and 2 showing a bail tripping mechanism with only a first projection member of the rotor braking device mounted thereon in accordance with a first embodiment of the present invention.

The reel body 2a is made, for example, of an aluminum alloy. The reel body 2a is integrally formed with the rod attachment leg 2c. The rod attachment leg 2c vertically extends from a top of the reel body 2a. As shown in FIG. 2, the space in the reel body 2a accommodates a rotor driving mechanism 5 and an oscillation mechanism 6. The rotor driving mechanism 5 is for rotating the rotor 3 in association with rotation of the handle 1. The oscillation mechanism 6 shifts the spool 4 back and forth to uniformly wind up the fishing line. The flange portion 2d and the reel unit cylindrical portion 2e are formed on the front end of the reel body 2a. The reel unit cylindrical portion 2e is open to the front and has a diameter that is smaller than a diameter of the flange portion 2d. As shown in FIGS. 2 and 5, the reel unit cylindrical portion 2e has a mounting groove 2f that is circular in cross-section and is formed in the reel unit cylindrical portion 2e. The lid member 2b is made of, for example, an aluminum alloy. The lid member 2b is screwed into the reel body 2a at three locations, for example.

As shown in FIG. 2, the rotor driving mechanism 5 includes a handle shaft 10, a face gear 11 and a pinion gear 12. The handle 1 is non-rotatably mounted on the handle shaft 10. The face gear 11 rotates together with the handle shaft 10. The pinion gear 12 meshes with the face gear 11. The pinion gear 12 is formed in a tubular shape. The pinion gear 12 has a front portion 12a that passes through a center of the rotor 3 and is fixed to the rotor 3 by a nut 13. A middle portion and a rear end portion of the pinion gear 12 are rotatably supported by the reel unit 2 with first and second bearings 14a and 14b, respectively.

The oscillation mechanism 6 moves the spool 4 in a back-and-forth direction by moving a spool shaft 15, which is coupled to a center of the spool 4 through a drag mechanism 71, in the back-and-forth direction.

As shown in FIG. 2, the rotor 3 includes a rotor unit 16, a bail arm 17 and a bail tripping mechanism 18. The bail arm 17 is mounted on the front end of the rotor unit 16 so that it pivots between a line-releasing position and a line-winding position. The bail tripping mechanism 18 is mounted to the rotor unit 16 in order to return the bail arm 17 from the line-releasing position to the line-winding position.

The rotor unit 16 includes a rotor unit cylindrical portion 30, a first rotor arm 31, a second rotor arm 32 and a front wall 33. The rotor unit cylindrical portion 30 is mounted to the reel body 2a to be able to rotate around the spool shaft 15. The first rotor arm 31 and the second rotor arm 32 are arranged to oppose each other on sides of the rotor unit cylindrical portion 30. The rotor unit cylindrical portion 30 and the first and second rotor arms 31 and 32 are made of, for example, an aluminum alloy. The first and second rotor arms 31 and 32 are integrally formed with each other.

The front wall 33 is formed on a front portion of the rotor unit cylindrical portion 30. The front wall 33 has a boss 33a that is formed in a center portion of the front wall 33. A through hole is formed in a center of the boss 33a. The front portion 12a of the pinion gear 12 and the spool shaft 15 pass through the through hole of the boss 33a. The nut 13 for securing the rotor 3 is disposed on a front part of the front wall 33. A rear surface of the rotor unit cylindrical portion 30 is covered with a third cover member 30a.

Figure 3A:
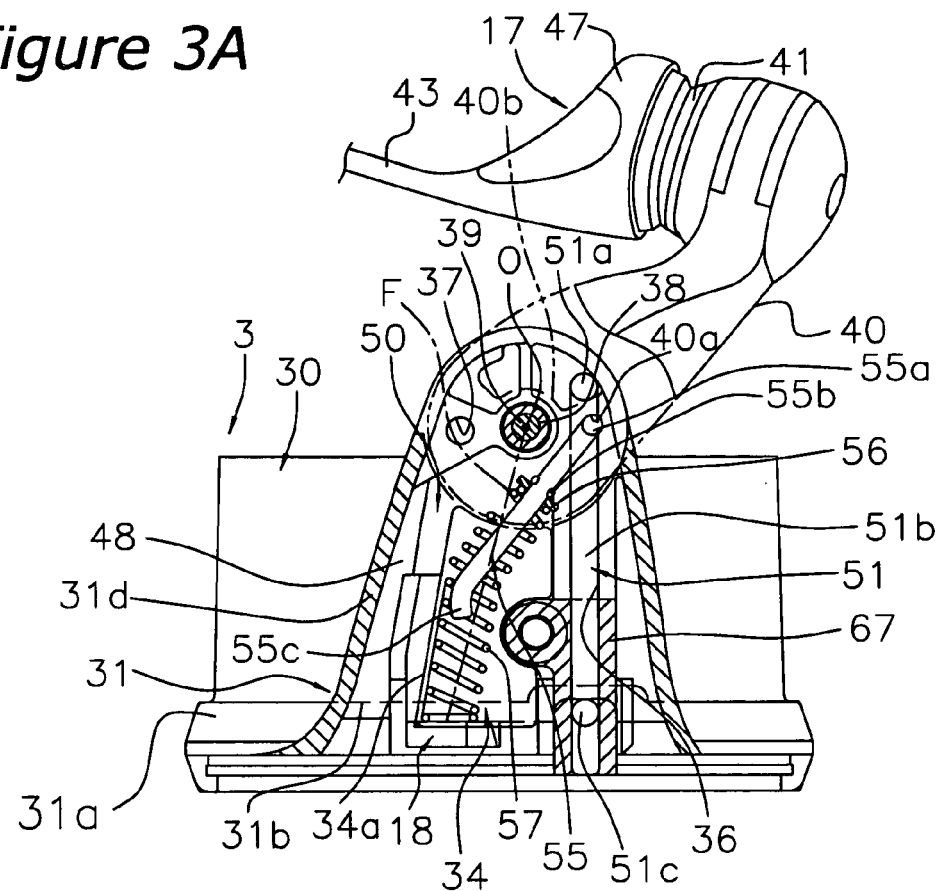
FIG. 3A is a partial cross-sectional view of a first rotor arm of the spinning reel of FIGS. 1 and 2 in a line-winding position in accordance with a first embodiment of the present invention.
Figure 3B:
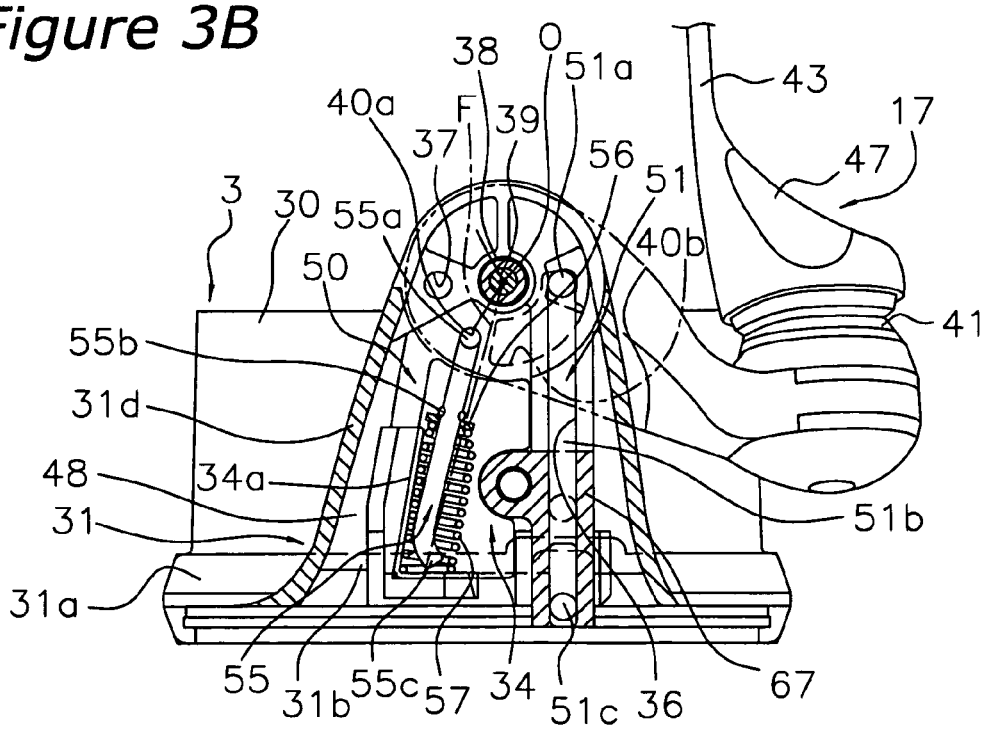
FIG. 3B is a partial cross-sectional view of a first rotor arm of the spinning reel of FIGS. 1 and 2 in a line-releasing position in accordance with a first embodiment of the present invention.
Figure 4:
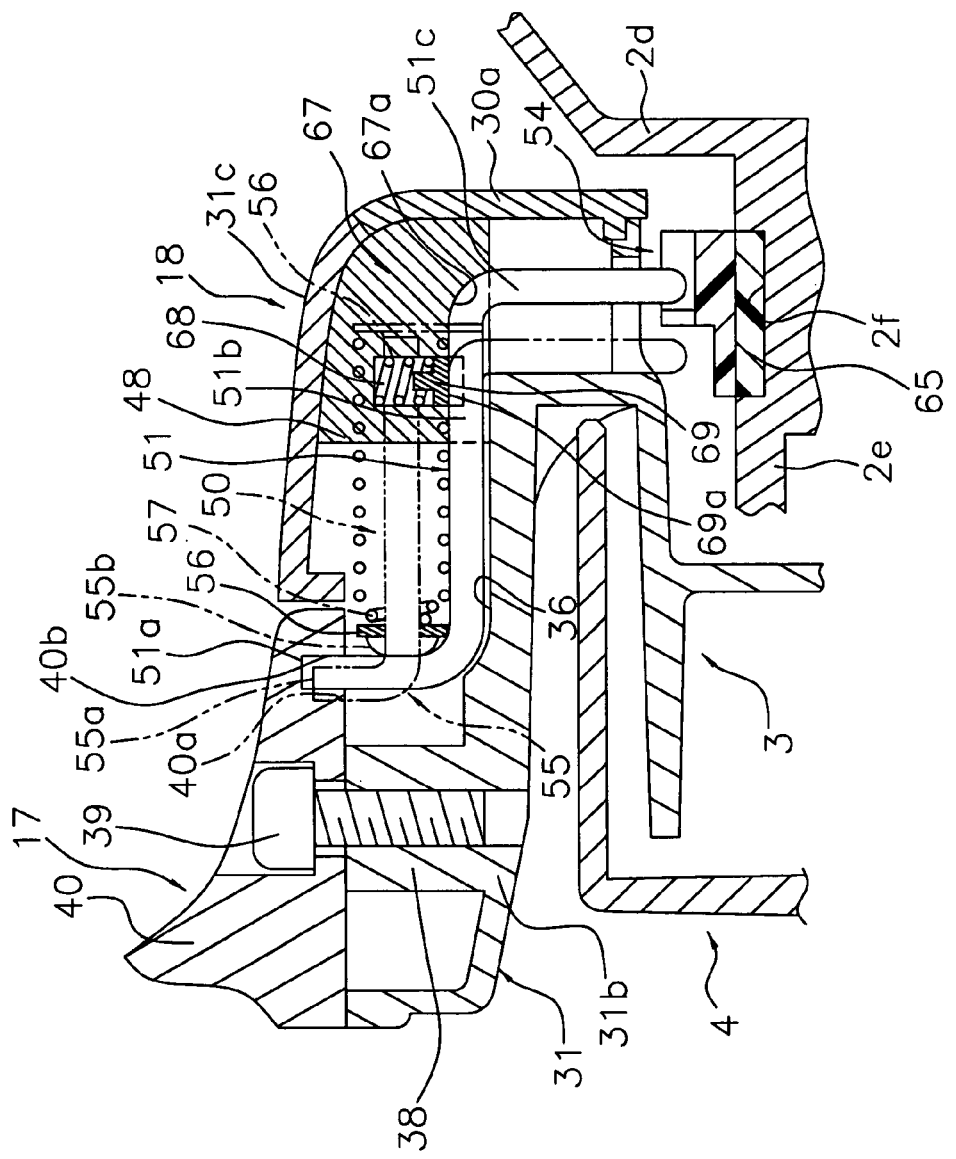
FIG. 4 is an enlarged partial cross-sectional view of the first rotor arm of the spinning reel of FIGS. 1 and 2 in accordance with a first embodiment of the present invention.

As shown in FIGS. 2-4, the first and second rotor arms 31 and 32 respectively include first and second connection portions 31a and 32a, first and second arm portions 31b and 32b and first and second cover members 31c and 32c. The first and second connection portions 31a and 32a are arranged at a peripheral surface at a rear portion of the rotor unit cylindrical portion 30. The first and second arm portions 31b and 32b respectively curve outward and extend forward from the first and second connection portions 31a and 32a. The first and second cover members 31c and 32c cover outer portions of the first and second connection portions 31a and 32a and the first and second arm portions 31b and 32b. The first and second connection portions 31a and 32a are formed in smooth peripheral continuation of the rotor unit cylindrical portion 30, respectively.

The first and second arm portions 31b and 32b are formed in smooth continuation of the first and second connection portions 31a and 32a. The first and second arm portions 31b and 32b extend forward while maintaining a gap between the rotor unit cylindrical portion 30 and the first and second arm portions 31b and 32b. The first and second arm portions 31b and 32b form a smooth curve from their tips to the portion where they are connected to the rotor unit cylindrical portion 30. Apertures 31d and 32d are formed in outer portions of both the first and second connection portions 31a and 32a and the first and second arm portions 31b and 32b. The first and second cover members 31c and 32c respectively occlude the apertures 31d and 32d from an outer peripheral side thereof. An accommodation space 48 is formed in a space surrounded by the first cover member 31c, the first connection portion 31a and the first arm portion 31b.

The bail arm 17 has a first bail support member 40 that is pivotally mounted to an outer peripheral side of a front end of the first arm portion 31b. As shown in FIGS. 3A, 3B and 4, the first arm portion 31b has a long and narrow guide groove 36, a mounting hole 37 and a boss 38. The boss 38 has a screw hole therein for pivotally mounting the first bail support member 40. A second bail support member 42 is pivotally mounted to an inner peripheral side of a front end of the second arm portion 32b.

The first bail support member 40 is attached to the first rotor arm 31 by an attachment pin 39 that is threaded at the boss 38 of the first arm portion 31b. The attachment pin 39 includes a bolt with a hexagon hole that makes it difficult for the fishing line to get caught at a screw head of the bolt.

As shown in FIGS. 3A and 3B, the bail arm 17 includes a line roller 41, a second bail support member 42, a bail 43 and a fixed shaft cover 47. The line roller 41 and the fixed shaft cover 47 are mounted on a front end of the first bail support member 40. The line roller 41 is for guiding a fishing line to the spool 4. The fixed shaft cover 47 is fixed to the first bail support member 40. The line roller 41 is arranged between the first bail support member 40 and the fixed shaft cover 47. The line roller 41 is rotatably mounted to a front end of the first bail support member 40. The fixed shaft cover 47 is shaped like a deformed cone having a sharpened tip. The bail 43 is formed by bending a wire into an approximate U-shape and is secured between a front end of the fixed shaft cover 47 and the second bail support member 42. The bail arm 17 guides the fishing line to the spool 4. The bail arm 17 is allowed to pivot between the line-winding position, as shown in FIG. 3A, and the line-releasing position, as shown in FIG. 3B. FIG. 3B shows where the bail arm 17 is tripped over from the line-winding position to the line-releasing position.

The bail tripping mechanism 18 is disposed in the accommodation space 48 of the first rotor arm 31. The bail tripping mechanism 18 restores the bail arm 17 from the line-releasing position to the line-winding position in association with rotation of the rotor 3. The bail tripping mechanism 18 maintains the bail arm 17 in the line-releasing position or the line-winding position.

As shown in FIGS. 3A–9C, 11 and 13 the bail tripping mechanism 18 includes a toggle spring mechanism 50, a switching member 52, a rotor braking device 54 and a restriction mechanism 75. The toggle spring mechanism 50 is pivotally mounted to the first arm portion 31b within the accommodation space 48. The switching member 52 is detachably/reattachably mounted on the flange portion 2d such that it selectively contacts the moving member 51. The restriction mechanism 75 restricts the bail arm 17 from returning to the line-winding position when in the line-releasing position. The restriction mechanism 75 (see FIG. 8) for conferring resistance to the bail arm 17 is mounted in the mounting hole 37.

Referring to FIGS. 3A and 3B, the toggle spring mechanism 50 is disposed inside the first rotor arm 31. The toggle spring mechanism 50 assumes a first position in which the bail arm 17 is in the line-winding position and a second position in which the bail arm 17 is in the line-releasing position. The toggle spring mechanism 50 serves as a mechanism for holding the bail arm 17 in the line-winding position or the line-releasing position. The toggle spring mechanism 50 includes a rod 55 and a coil spring 57. One end of the rod 55 is interlocked with the first bail support member 40 and another end extends along the first arm portion 31b. The coil spring 57 urges the rod 55 outward.

As shown in FIG. 4, the rod 55 has an interlocking portion 55a, an interlocking protrusion 55b and a bent portion 55c. The interlocking portion 55a is disposed at a front end of the rod 55. The interlocking portion 55a is bent over towards the first bail support member 40 so as to interlock with an engaging hole 40a of the first bail support member 40. The interlocking protrusion 55b is disposed at an intermediate portion of the rod 55. The interlocking protrusion 55b is for interlocking with a front end portion of the coil spring 57. The bent portion 55c is disposed on a rear end of the rod 55. The bent portion 55c is slightly bent. A washer 56 is mounted to the interlocking protrusion 55b. The front end portion of the coil spring 57 abuts against the washer 56. Thus, power from the front end portion of the coil spring 57 is uniformly transmitted to the rod 55.

The coil spring 57 contacts a guide sheet 34. The coil spring 57 is guided by the guide sheet 34. The guide sheet 34 is made of a synthetic resin, such as a polyamide synthetic resin. The guide sheet 34 is mounted to the first arm portion 31b. The guide sheet 34 includes a wall portion 34a that is bent to guide one side surface of the coil spring 57 and interlock with the base end portion thereof. The wall portion 34a has a height that allows the wall portion 34a to contact a lateral portion and the base end portion of the coil spring 57. Thus, the coil spring 57 is easily compressed and the first arm portion 31b is not damaged when the coil spring 57 is compressed.

The front end portion of the coil spring 57 is interlocked with the washer 56. The front end portion of the coil spring 57 has a smaller coil diameter than other portions of the coil spring 57. Thus, the coil spring 57 is not easily deformed even when a large gap is created between the coil spring 57 and the rod 55 in a portion other than the front end portion. Accordingly, the rod 55 changes its position inside the coil spring 57. It will be apparent to one of skill in the art that it is also possible to provide a boss that contacts an inner peripheral surface of the base end portion of the coil spring 57 and a cover portion that covers an outer peripheral surface of the base end portion of the coil spring 57 in order to interlock the base portion of the coil spring 57. Furthermore, it is also possible to mount the boss and the cover portion on the first arm portion 31b such that they can pivot around an axis parallel to the pivot axis of the first bail support member 40. For example, it is assumable to form an arc-shaped convex portion on the base end surface of the boss and an arc-shaped concave portion that engages with the arc-shaped convex portion in the first arm portion 31b so as to make the boss pivotable.

The toggle spring mechanism 50 is disposed such that the positions at which the rod 55 is engaged with the first bail support member 40 in the line-winding position and the line-releasing position are in different directions with respect to a line segment connecting the coil spring 57 (which is the axis of the pivot shaft), the central position of the base end, and a pivot axis O of the first bail support member 40 (i.e., the axis of the attachment pin 39). The position at which the toggle spring mechanism 50 overlaps with the line is a dead point of the toggle spring mechanism 50 (i.e., the position at which the coil spring 57 is most compressed). Thus, the toggle spring mechanism 50 toggles the bail arm 17 between two positions that interpose the dead point. The toggle spring mechanism 50 can urge the bail arm 17 toward both positions. The toggle spring mechanism 50 is able to maintain the bail arm 17 in both positions. The dead point of the toggle spring mechanism 50 is shifted toward the line-releasing position.

The rotor braking device 54 includes a moving member 51, a braking member 65 and a frictional force adjusting unit. The moving member 51 is a component formed by bending both ends of a wire in directions differing by 90 degrees. Referring to FIGS. 3A-7 and 9A-9C, the moving member 51 is made of a metal, such as a stainless steel alloy. The moving member 51 is mounted in the accommodation space 48 such that it can be freely moved approximately back and forth. The moving member 51 is mounted on the first arm portion 31b such that the moving member 51 is able to move approximately back and forth between a first position (i.e., withdrawn position), as shown in FIG. 3A, and a second position (i.e., contact position), as shown in FIG. 3B. Referring to FIGS. 3A-6, the moving member 51 has a front end portion 51a, a middle portion 51b and a rear end portion 51c. The front end portion 51a is bent outwardly and interlocked with a fan-shaped engaging groove 40b formed on the first bail support member 40. The middle portion 51b extends along the first arm portion 31b radially inward of the rod 55.

The rear end portion 51c passes through the guide groove 36. The rear end portion 51c projects inwardly to a position where the rear end portion 51c slightly overlaps with a part of the rotor braking device 54. A width of the guide groove 36 is approximately the same as a diameter of the moving member 51. Therefore, an inner side in the radial direction of the middle portion 51b of the moving member 51 is guided back and forth along the guide groove 36 in association with the pivot of the bail arm 17. An outer peripheral side of a crook portion between the middle portion 51b and the rear end portion 51c is guided in the back-and-forth direction and the radial direction by a guide member 67. The guide member 67 is secured to the first cover member 31c. The guide member 67 has a curved concave groove 67a that is formed inside the guide member 67 so that the rear end portion 51c is engaged therewith.

The guide member 67 further has a cylindrical shaped mounting hole 67b on which a push spring 68, comprised of a coil spring, is mounted. The mounting hole 67b is formed by making a hole in the concave groove 67a of the guide member 67. The push spring 68 is mounted on the concave groove 67a in the compressed state. The push spring 68 urges the rear end portion 51c toward the rotor braking device 54 of the bail tripping mechanism 18 by pressing down on the middle portion 51b of the moving member 51. Referring to FIG. 4, a push member 69, having a semi-circular concave portion 69a, is mounted on a front end of the push spring 68 so as to engage with the outer peripheral surface of the middle portion 51b of the moving member 51. The push member 69 is provided for making the middle portion 51b of the moving member 51 move back and forth, and to efficiently transmit an urging force of the push spring 68 to the middle portion 51b.

When the bail arm 17 is in the line-releasing position, an end of the moving member 51 that interlocks with the engaging groove 40b is positioned at a line-winding positional side of a line segment joining the rear end portion 51c and the pivotal center of the bail arm 17. In other words, the moving member 51 is positioned so that in both the first position (i.e., withdrawn position) and the second position (i.e., contact position), the location where the moving member 51 is interlocked with the first bail support member 40 exists in the same direction as the line segment joining the axis of the rear end portion 51c in the contact position (FIG. 3B) with the pivot axis of the first bail support member 40. Thus, when the switching member 52 presses against the rear end portion 51c of the moving member 51, the first bail support member 40 is restored to the line-winding position. In the second position (i.e., contact position), the end surface of the rear end portion 51c extends downward beyond the front end surface of the braking member 65 and slightly inward from the outer peripheral surface thereof. Therefore, the same braking power is obtained even if the moving member 51 moves only an insignificant amount.

Figure 6:
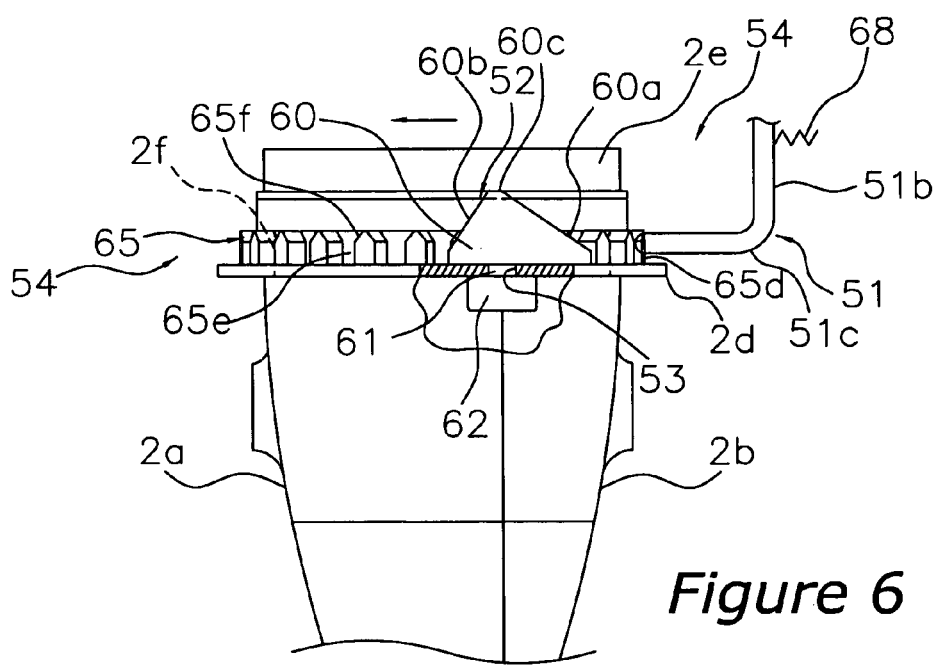
FIG. 6 is a partial bottom view of the reel body of FIG. 5 showing the bail tripping mechanism and the rotor braking device in accordance with a first embodiment of the present invention.

Referring to FIG. 6, the switching member 52 is made of a synthetic resin, such as a polyamide synthetic resin or polyacetal resin. As shown in FIGS. 5 and 6, the switching member 52 is detachably/reattachably mounted on the flange portion 2d at a portion where the reel body 2a and the lid member 2b are separated from each other. A rectangular cutout 53 is formed on the portion where the reel body 2a and the lid member 2b are separated from each other. The switching member 52 includes a cone shaped cam portion 60, a neck portion 61 and a brim portion 62. The neck portion 61 is integrally formed with the cam portion 60. The cam portion 60 has first and second oblique surfaces 60a and 60b and a projecting tip 60c. A downstream side in the line-winding direction (shown by the arrow in FIG. 6) of the first oblique surface 60a projects forward toward the rotor 3 more than an upstream side of the first oblique surface 60a. The amount that the second oblique surface 60b projects toward the rotor 3 decreases from a projecting portion of the first oblique surface 60a to the downstream side in the line-winding direction. The projecting tip 60c is the highest forward-projecting point of the first and second oblique surfaces 60a and 60b. The projecting tip 60c projects forward an amount that exceeds the dead point of the toggle spring mechanism 50 when the rear end portion 51c of the moving member 51 contacts the first oblique surface 60a and pushes the bail arm 17 toward the line-winding position.

As shown in FIG. 6, the neck portion 61 is sized to fit into the cutout 53 of the flange portion 2d. A gap is formed between the cam portion 60 and the brim portion 62. A dimension of the gap is approximately the same as the wall thickness of the flange portion 2d. The brim portion 62 has a cross-section larger than a cross-section of the neck portion 61. The brim portion 62 contacts the rear surface of the flange portion 2d. When the bail arm 17 is in the line-releasing position, even if the rotor 3 is forced to rotate in reverse (i.e., rotation in the line-releasing direction), and thus the moving member 51 contacts the switching member 52, the moving member 51 of the bail tripping mechanism 18 is smoothly guided by the second oblique surface 60b of the switching member 52.

The braking member 65 is provided for braking rotation of the rotor 3 when the bail arm 17 is in the line-releasing position. As shown in FIGS. 5 and 6, the braking member 65 includes a first interposed member 65a, a second interposed member 65b, a drag portion 65c, a plurality of engaging portions 65d, an annular body member 65e and a plurality of tapered portions 65f. The first and second interposed members 65a and 65b are detachably/reattachably provided between the mounting groove 2f and the body member 65e. The first and second interposed members 65a and 65b are each comprised of an approximately semi-cylindrical shaped member.

The body member 65e is an annular member comprised of a synthetic resin, such as urethane with a large frictional resistance. The body member 65e is secured by press-contacting an outer periphery of the first and second interposed members 65a and 65b with the elastic force thereof. The engaging portions 65d are provided at an outer periphery of the body member 65e. The engaging portions 65d engage with the rear end portion 51c of the moving member 51. The engaging portions 65d are disposed on the outer periphery of the braking member 65. The engaging portions 65d are grooves with which the rear end portion 51c engages. In addition, the tapered portions 65f that incline toward the engaging portions 65d are formed in a cone shape at a plurality of locations on the body member 65e. The tapered portions 65f have an oblique surface that is formed to guide the rear end portion 51c to the engaging portions 65d.

The first and second interposed members 65a and 65b are comprised of two approximately semi-cylindrical members made of a synthetic resin such as a polyamide resin or a polyacetal resin with a frictional resistance that is smaller than that of a synthetic resin such as urethane. The drag portion 65c rotatably and frictionally engages with the mounting groove 2f. The drag portion 65c is provided with the inner peripheral portions of the first and second interposed members 65a and 65b. A frictional force is generated in the drag portion 65c when the first and second interposed members 65a and 65b are pressed into contact with the mounting groove 2f by the elastic force of the body member 65e.

Figure 11:
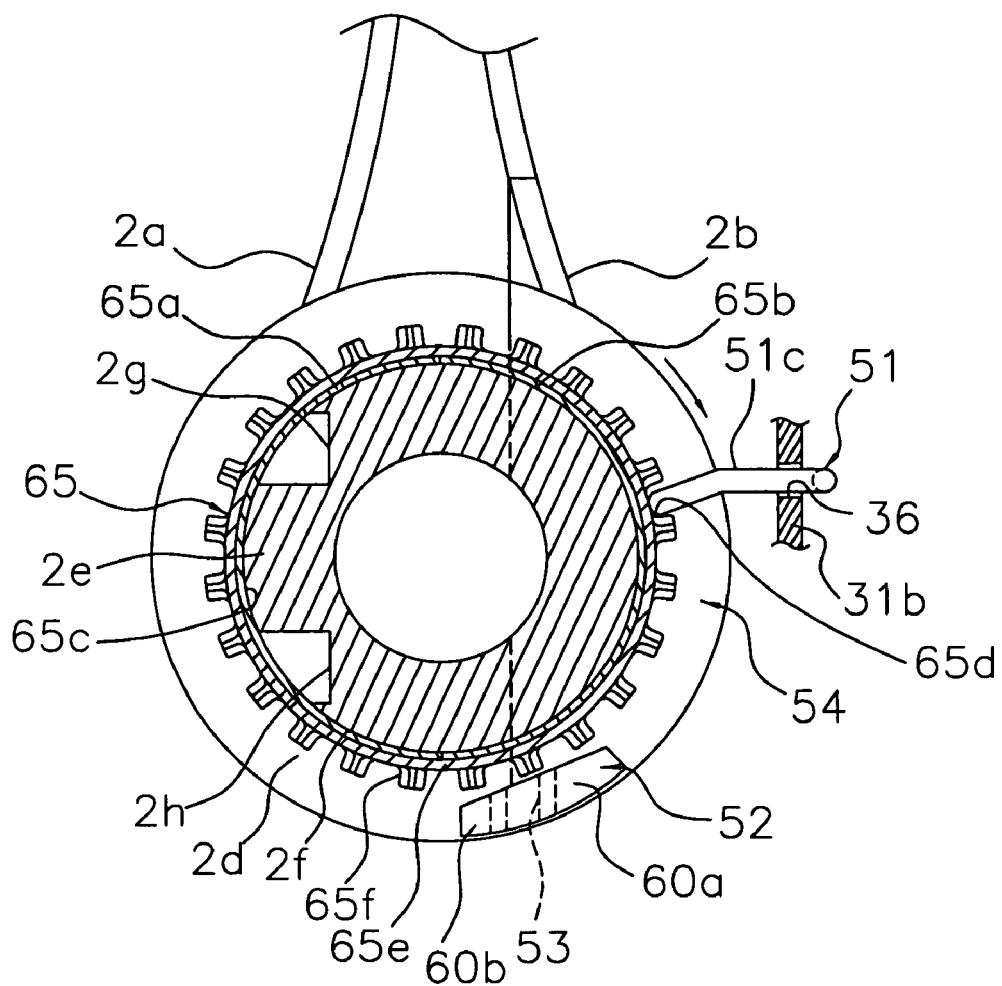
FIG. 11 is a plan view of the reel body of FIG. 5 when neither the first projection member nor a second projection member is mounted thereon in accordance with a first embodiment of the present invention.
Figure 13:
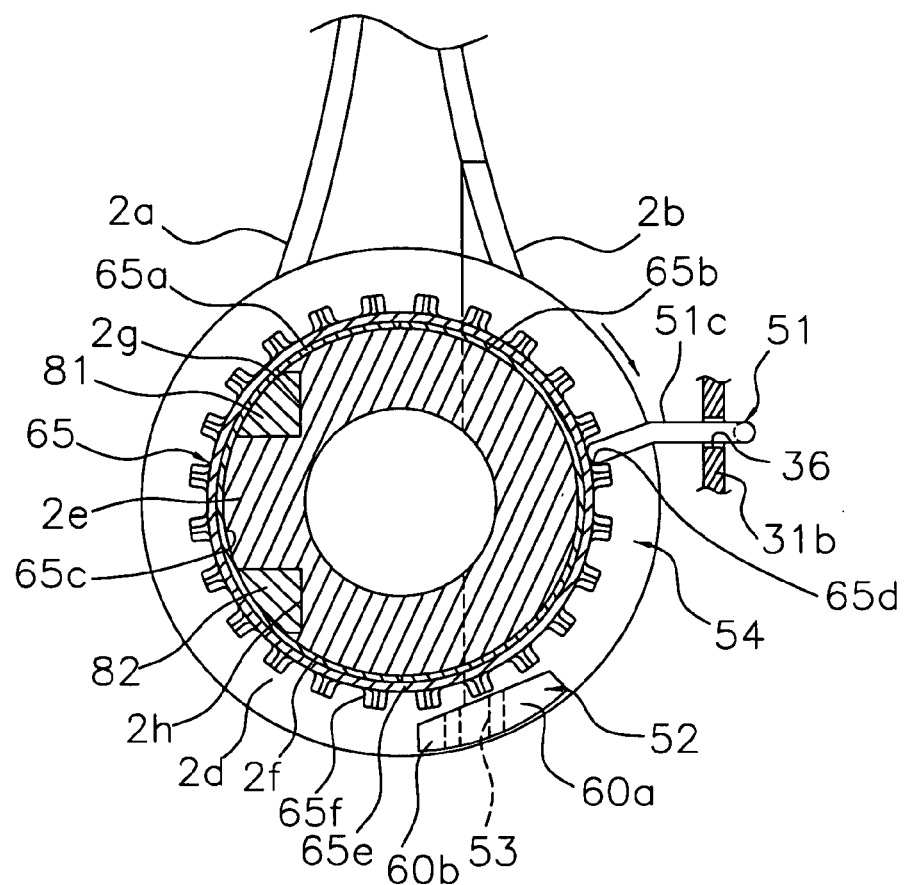
FIG. 13 is a plan view of the reel body shown in FIG. 5 when both the first projection member and the second projection member are mounted thereon in accordance with a first embodiment of the present invention.

The frictional force adjusting unit includes first and second concave portions 2g and 2h and first and second projection members 81 and 82. As shown in FIGS. 5, 11, and 13, the braking member 65 in this rotor braking device 54 is configured to adjust the braking force thereof by detaching/reattaching the first projection member 81 and the second projection member 82 from/to the first concave portion 2g and the second concave portion 2h, respectively. The first concave portion 2g and the second concave portion 2h are formed in the mounting groove 2f. The same sides of the first and second concave portions 2g and 2h have an opening. The first and second concave portions 2g and 2h are symmetrically arranged to each other astride a line intersecting with a center line of the flange portion 2d. The first and second projection members 81 and 82 contact the inner periphery of the first and second interposed members 65a and 65b.

It will be apparent to one of skill in the art from this disclosure that the number and shape of the first and second concave portions 2g and 2h and the first and second projection members 81 and 82 are not limited to the described configuration.

Figure 10:
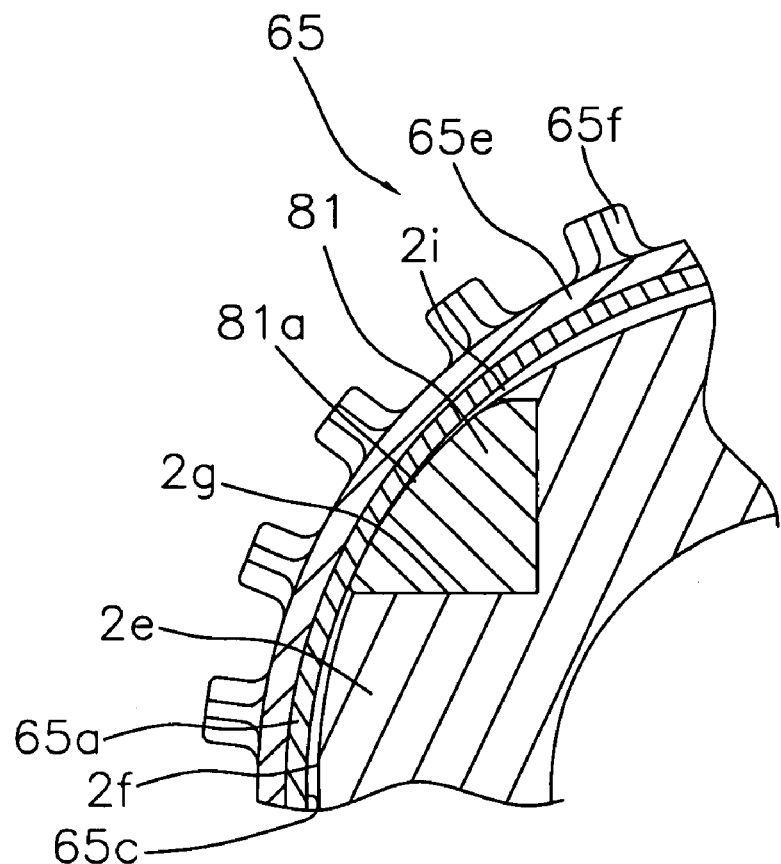
FIG. 10 is an enlarged lateral side partial cross-sectional view of the rotor braking device of FIG. 5 showing a braking member and a frictional force adjusting unit with only the first projection member mounted thereon in accordance with a first embodiment of the present invention.

As shown in FIGS. 5 and 10, the first projection member 81 is mounted on the first concave portion 2g. As shown in FIG. 10, the first projection member 81 has a front end portion 81a. The first projection member 81 is mounted to the first concave portion 2g so that the front end portion 81a projects outward. Because of this, a gap 2i is formed between the mounting groove 2f and the first interposed member 65a adjacent a portion where the first projection member 81 is mounted. Accordingly, the body member 65e and the first interposed member 65a are stretched outwardly according to an amount of projection of the first projection member 81. Therefore, a pressure-contact force of the first interposed member 65a with respect to the mounting groove 2f increases and thus, the braking force of the braking member 65 increases.

Figure 12:
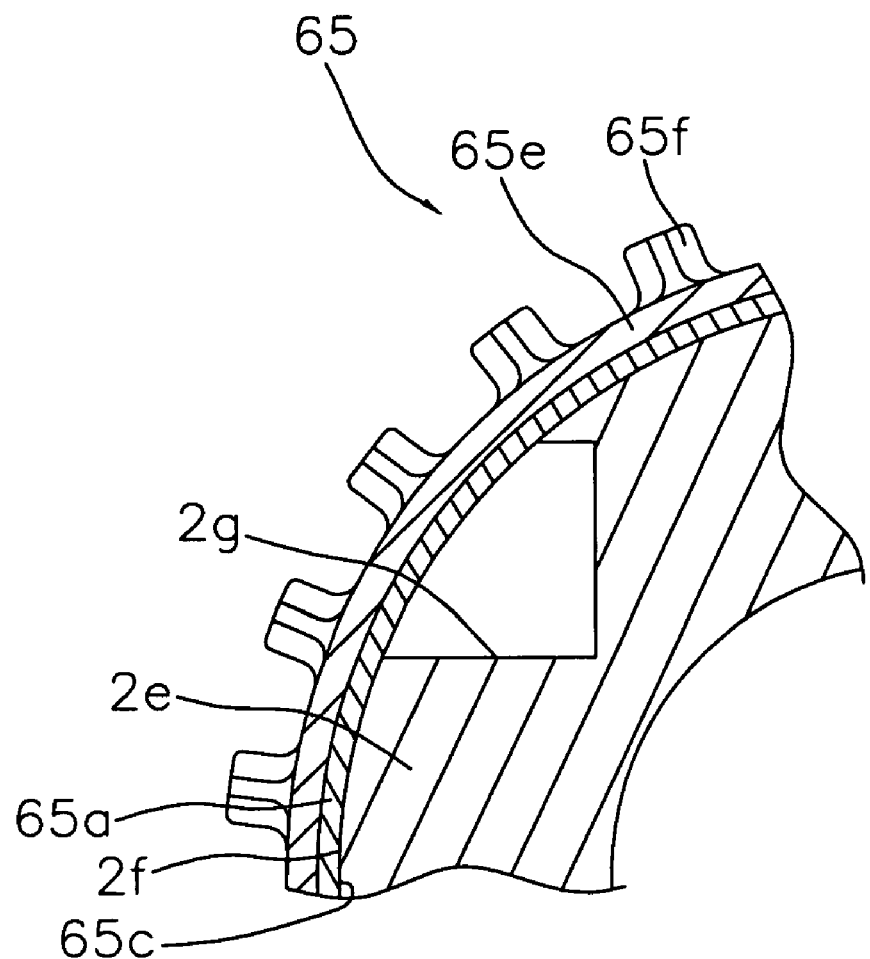
FIG. 12 is an enlarged lateral side partial cross-sectional view of the reel body of the rotor braking device shown in FIG. 11 when neither the first projection member nor the second projection member is mounted thereon in accordance with a first embodiment of the present invention.

As shown in FIGS. 11 and 12, neither the first projection member 81 nor second the projection member 82 is mounted on the first and second concave portions 2g and 2h. In this case, no gap 2i is formed between the mounting groove 2f and the first interposed member 65a. Therefore, the body member 65e and the first interposed member 65a are not outwardly stretched. Accordingly, the pressure-contact force of the first interposed member 65a with respect to the mounting groove 2f is smaller than in the case shown in FIGS. 5 and 10 and thus, the braking force of the braking member 65 decreases.

Referring to FIG. 13, the first and second projection members 81 and 82 are mounted on the first and second concave portions 2g and 2h. In this case, a gap 2i is formed between the mounting groove 2f and the first interposed member 65a. The gap 2i is larger than the gap 2i formed in the case shown in FIGS. 5 and 10. Accordingly, the body member 65e and the first interposed member 65a are greatly stretched outwardly according to the projection amount of the first and second projection members 81 and 82. Therefore, the pressure-contact force of the first interposed member 65a with respect to the mounting groove 2f greatly increases and thus, the braking force of the braking member 65 increases compared to the case shown in FIGS. 5 and 10.

Here, manufacturers and anglers can arbitrarily adjust the braking force of the braking member 65 by either of three options: 1) a small braking force is generated when neither first projection member 81 nor second projection member 82 is mounted on the first and second concave portions 2g and 2h (see FIGS. 11 and 12); 2) a large braking force is generated when only the first projection member 81 is mounted on the first concave portion 2g (see FIGS. 5 and 10); and 3) a much larger braking force is generated when both the first and second projection members 81 and 82 are mounted on the first and second concave portions 2g and 2h, respectively (see FIG. 13).

Referring to FIGS. 5 and 10, only the first projection member 81 is mounted on the first concave portion 2g. However, the first and second projection members 81 and 82 are symmetrically formed to each other. Therefore, even if only the second projection member 82 is mounted on the second concave portion 2h, the braking force of the braking member 65 is the same as the braking force obtained in the case shown in FIGS. 5 and 10.

Figure 7:
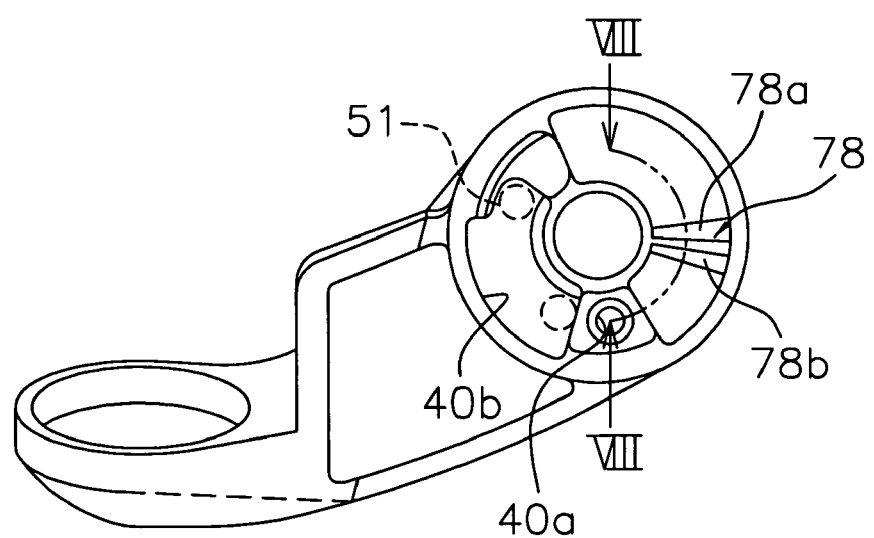
FIG. 7 is a sectional view of a first bail support member of the spinning reel of FIGS. 1 and 2 in accordance with a first embodiment of the present invention.
Figure 8:
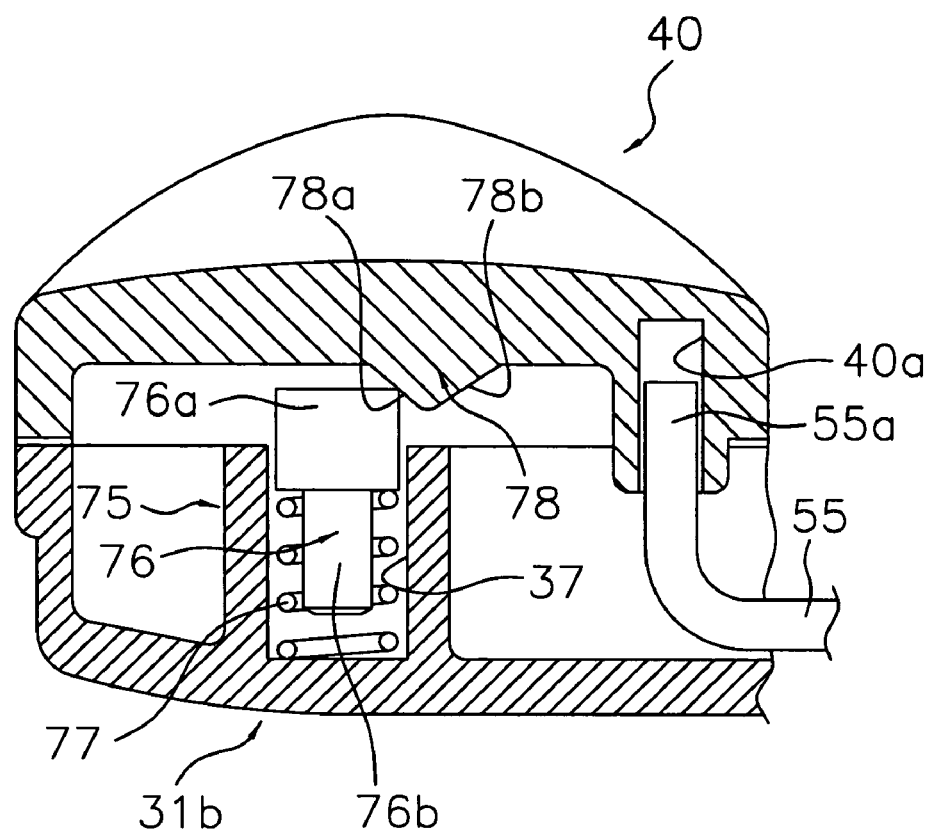
FIG. 8 is a cross-sectional view taken along line VIII-VIII in FIG. 7 in accordance with a first embodiment of the present invention.

Referring to FIG. 8, the restriction mechanism 75 is provided between the opposing portions of the bail arm 17 and the first arm portion 31b of the rotor 3. The restriction mechanism 75 restricts the bail arm 17 from returning to the line-winding position when the bail arm 17 is disposed in the line-releasing position and releases the restriction when the bail arm 17 pivots to the line-winding position before the rear end portion 51c of the moving member 51 reaches the projecting tip 60c of the first oblique surface 60a. Referring to FIGS. 7 and 8, the restriction mechanism 75 includes a restriction pin 76, coil spring 77 and a pushing portion 78. The restriction pin 76 is mounted in the mounting hole 37 of the first arm portion 31b. The coil spring 77 urges the restriction pin 76 toward the bail arm 17. The pushing portion 78 is provided on the first bail support member 40.

Figure 9C:
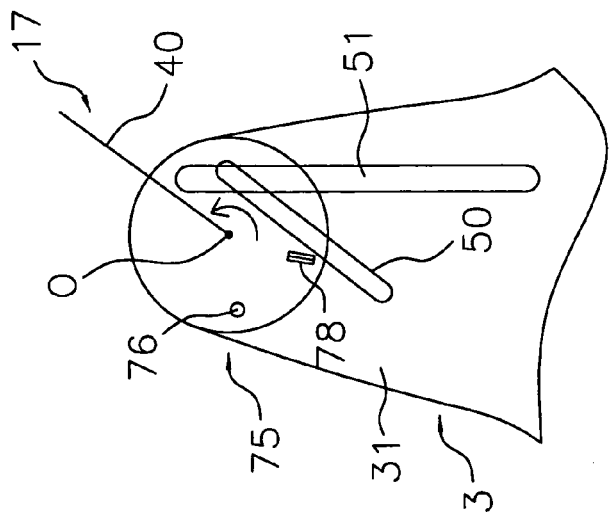
FIGS. 9A-9C are a schematic view showing changes in a restriction state when a bail arm of the spinning reel of FIGS. 1 and 2 is pivoted in accordance with a first embodiment of the present invention.
Figure 9B:
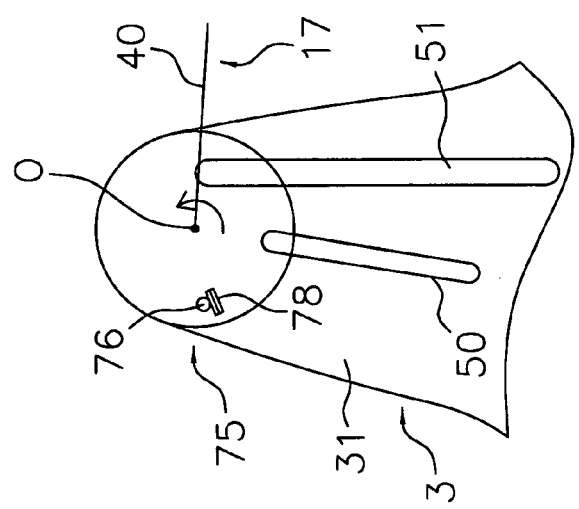
Figure 9A:
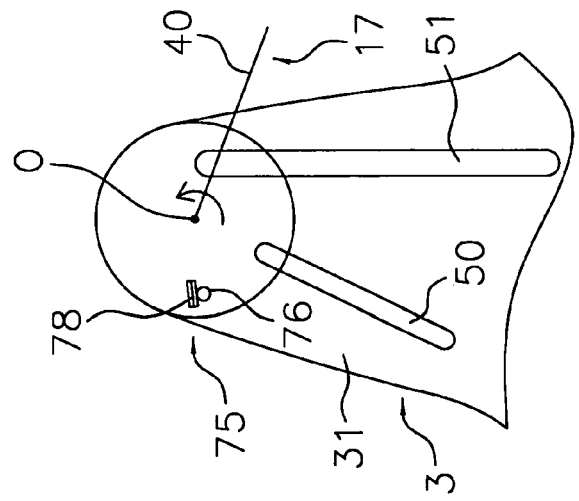

The restriction pin 76 is a metal pin having a large-diameter contact portion 76a and a small-diameter spring mounting portion 76b. A front end of the coil spring 77 contacts a stepped portion between the contact portion 76a and the spring mounting portion 76b. The coil spring 77 is disposed around an outer periphery of the spring mounting portion 76b. The coil spring 77 urges the restriction pin 76 toward the first bail support member 40. The pushing portion 78 has first and second oblique surfaces 78a and 78b. The pushing portion 78 is formed to project toward the first arm portion 31b. When pivoted from the line-releasing position to the line-winding position, the pushing portion 78 is disposed in a position in which it can pass over the restriction pin 76 and release the restriction before the rear end portion 51c of the moving member 51 reaches the projecting tip 60c of the first oblique surface 60a. More specifically, as shown in FIG. 9A the pushing portion 78 is positioned upstream from the restriction pin 76 in the pivot direction toward the line-winding position shown by the arrow when in the line-releasing position. In addition, as shown in FIG. 9B, the pushing portion 78 is positioned to pass over the restriction pin 76 before the toggle spring mechanism 50 reaches the dead point while pivoting to the line-winding position.

In the bail tripping mechanism 18 configured in this manner, the toggle spring mechanism 50 is toggled between the first position shown in FIG. 3A and the second position shown in FIG. 3B. The first position corresponds to the line-winding position of the bail arm 17 and the second position corresponds to the line-releasing position of the bail arm 17. Furthermore, the rear end portion 51c of the moving member 51 is guided by the guide groove 36 and can move back and forth between the first position (i.e., withdrawn position) shown in FIG. 3A and the second position (i.e., contact position) shown in FIG. 3B. In the second position (i.e., contact position), the rear end portion 51c of the moving member 51 engages with the engaging portion 65d of the braking member 65. At this time, when the rotor 3 and the braking member 65 rotate, the rotor 3 is braked because the drag portion 65c frictionally engages with the mounting groove 2f.

In addition, if the rotor 3 is rotated by operation of the handle 1 in the line-winding direction when in the second position (i.e., contact position), the rear end portion 51c of the moving member 51 strikes the first oblique surface 60a of the switching member 52 and rotates. Then, the moving member 51 is pushed forward toward the first position (i.e., withdrawn position) and the bail arm 17 returns to the line-winding position at the point the dead point of the toggle spring mechanism 50 is exceeded. At this time, the restriction due to the restriction pin 76 of the restriction mechanism 75 is released before the dead point of the toggle spring mechanism 50 is exceeded.

As shown in FIG. 2, an anti-reverse rotation mechanism 70 for blocking and releasing the reverse rotation of the rotor 3 is disposed inside the cylindrical portion 30 of the rotor 3. The anti-reverse rotation mechanism 70 has a roller type one-way clutch and blocks or releases the reverse rotation of rotor 3 by switching the one-way clutch between an operating state and a non-operating state.

The spool 4 is arranged between the first rotor arm 31 and the second rotor arm 32 of the rotor 3. The spool 4 is mounted on the front end of the spool shaft 15 through the drag mechanism 71. The spool 4 includes a bobbin trunk 4a, a skirt portion 4b and a flange portion 4c. The fishing line is wound around an outer periphery of the bobbin trunk 4a. The skirt portion 4b is integrally formed with a rear of the bobbin trunk 4a. The flange portion 4c is integrally formed with a front end of the bobbin trunk 4a.

Next, the handling and operation of the reel will be described in detail.

When casting, the anti-reverse rotation mechanism 70 blocks the reverse rotation of the rotor 3, and the bail arm 17 is tripped into the line-releasing position by hand. When the bail arm 17 is tripped into the line-releasing position, the first bail support member 40 and the second bail support member 42 flip over backwards and the bail tripping mechanism 18 takes up the second position shown in FIG. 3B. Then, in the restriction mechanism 75, the pushing portion 78 passes over the restriction pin 76 when the dead point of the toggle spring mechanism 50 is exceeded. When the bail arm 17 is flipped into the line-releasing position, the fishing line is easily reeled out from the spool 4.

During the pivot from the line-winding position to the line-releasing position, the rotation of the first bail support member 40 makes the rod 55 in the toggle spring mechanism 50 gradually retreat and pivot counterclockwise, as shown in FIG. 3A, to the second position shown in FIG. 3B. At this time, the rod 55 retreats until the dead point is exceeded. When the dead point is exceeded, the urging force of the coil spring 57 pushes the rod 55 out and switches the bail arm 17 to the line-releasing position and the same position is maintained. When the dead point is exceeded, the pushing portion 78 of the restriction mechanism 75 crosses over the restriction pin 76 and restricts the bail arm 17 from pivoting to the line-winding position. At the point the pushing portion 78 has passed over the restriction pin 76, the restriction pin 76 rapidly strikes the first bail support member 40 and generates a sound.

When the bail arm 17 pivots to the line-releasing position, the rear end portion 51c of the moving member 51 engages with an engaging portion 65d of the braking member 65 as the bail arm 17 is being pivoted. Then, when the rotor 3 and the braking member 65 rotate, the rotor 3 is braked because the drag portion 65c frictionally engages with the mounting groove 2f.

In this state, the fishing rod is cast while the fishing line is hooked with the index finger of the hand by which the fishing rod is held. Accordingly, the fishing line is released with high momentum due to the weight of the tackle. At this time, as described above, the bail arm 17 is restricted by the restriction mechanism 75 from easily returning to the line-winding position from the line-releasing position.

After casting, when the handle 1 is rotated in the line-winding direction while the bail arm 17 is maintained in the line-releasing position, the rotor driving mechanism 5 rotates the rotor 3 in the line-winding direction. When the rotor 3 rotates in the line-winding direction, the bail tripping mechanism 18 restores the bail arm 17 to the line-winding position.

With this type of rotor braking device 54, when the bail arm 17 pivots from the line-winding position to the line-releasing position, the rear end portion 51c of the moving member 51 engages with the engaging portion 65d of the braking member 65. In addition, when the rotor 3 and the braking member 65 rotate, the rotor 3 is braked because the drag portion 65c frictionally engages with the mounting groove 2f. Here, the drag portion 65c rotatably and frictionally engages with the mounting groove 2f. Therefore, the drag portion 65c uniformly brakes the rotor 3 with the whole thereof while the conventional drag portion brakes the rotor with a portion thereof. Thus, the braking force is stabilized.

In the aforementioned embodiments, a front drag spinning reel was explained as an example. However, the present invention can be applied to the bail tripping device of all types of spinning reels, such as a rear drag spinning reel or a lever brake spinning reel that returns a pivotable bail arm to the line-winding position.

Second Embodiment

Figure 14:
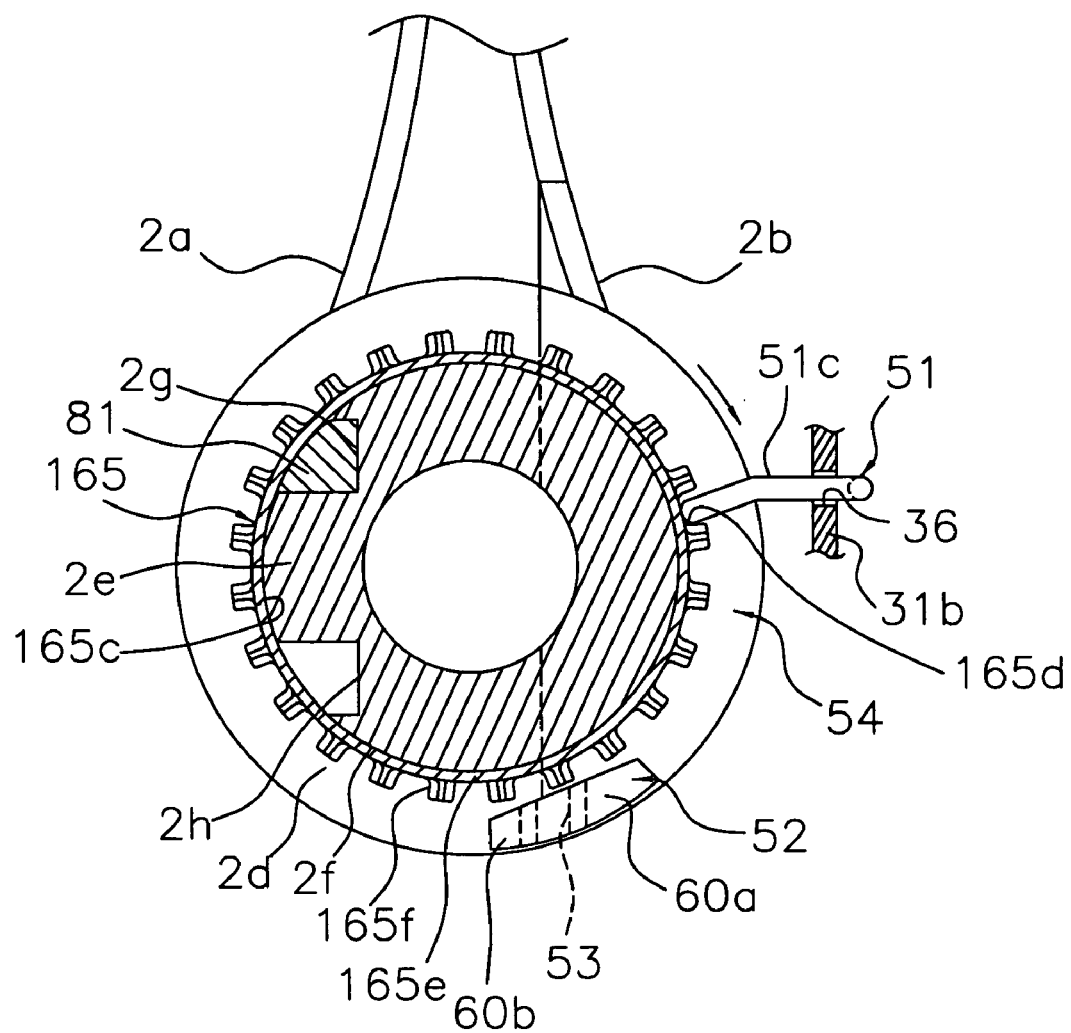
FIG. 14 is a plan view of a reel body of the spinning reel of FIG. 1 with a rotor braking device in accordance with a second embodiment of the present invention.

Referring now to FIG. 14, a spinning reel rotor braking device 154 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the braking member 65 has the body member 65e and the first and second interposed members 65a and 65b. However, as shown in FIG. 14, a braking member 165 of the rotor braking device 154 is configured to include neither the first interposed member 65a nor the second interposed member 65b. The braking member 165 has a drag portion 165c that is mounted on an inner peripheral portion of a body member 165e. Therefore, the body member 165e may be made of a synthetic resin such as a polyamide synthetic resin or a polyacetal resin.

Third Embodiment

Figure 15:
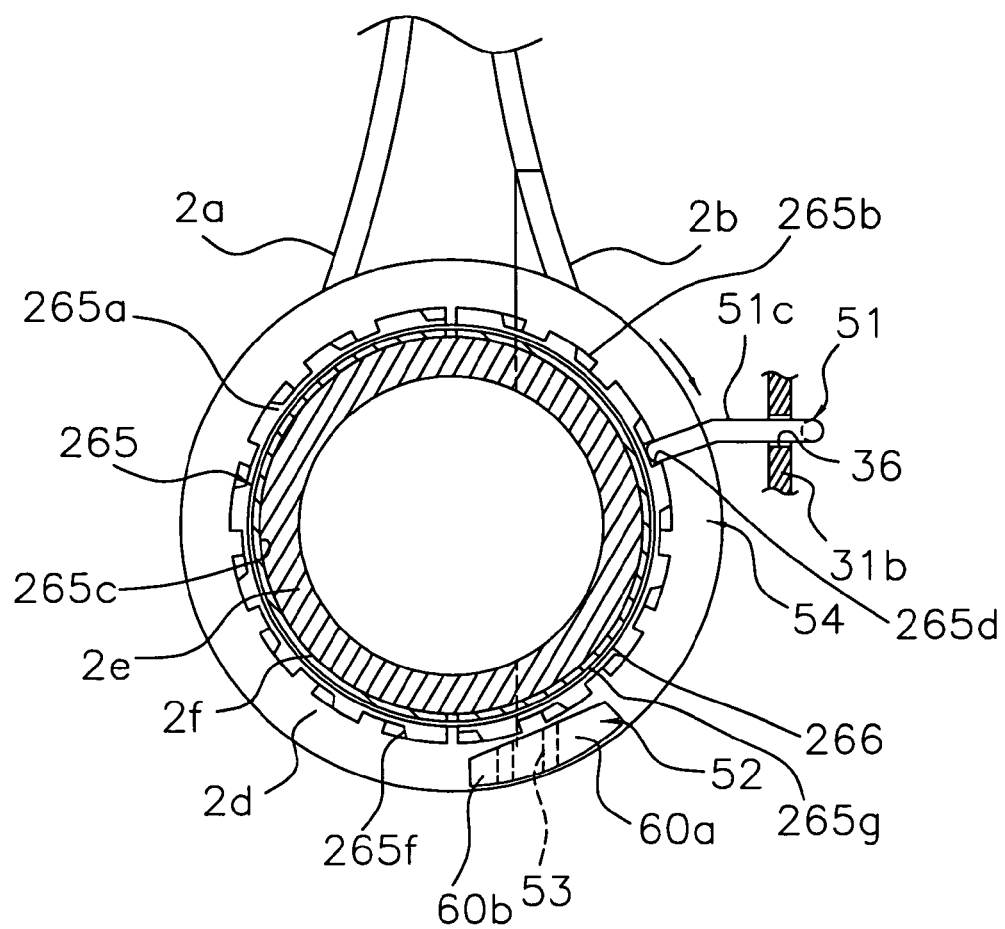
FIG. 15 is a plan view of a reel body of the spinning reel of FIG. 1 with a rotor braking device in accordance with a third embodiment of the present invention.

Referring now to FIG. 15, a spinning reel rotor braking device 254 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the body member 65e of the braking member 65 is an annular member. In the third embodiment, a braking member 265 of the rotor braking device 254 includes a first and second synthetic resin members 265a and 265b formed in an approximately semi-circular shape, as shown in FIG. 15. The first and second synthetic resin members 265a and 265b have a plurality of engaging portions 265d. In this configuration, a drag portion 265c is press-contacted to the mounting groove 2f by a spring member 266. The spring member 266 is mounted on an annular groove 265g. The annular groove 265g is formed on an outer peripheral side of the first and second synthetic resin members 265a and 265b.

Fourth Embodiment

Figure 16:
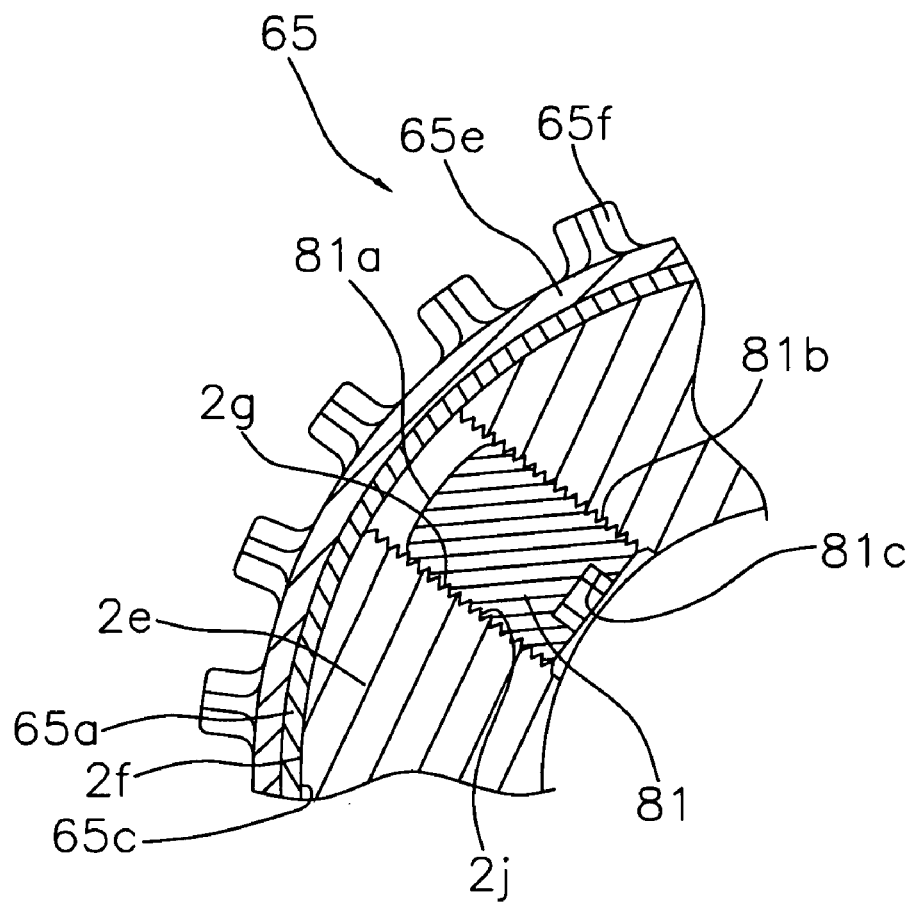
FIG. 16 is an enlarged lateral side partial cross-sectional view of a spinning reel of FIG. 1 with a rotor braking device in accordance with a fourth embodiment of the present invention.
Figure 17:
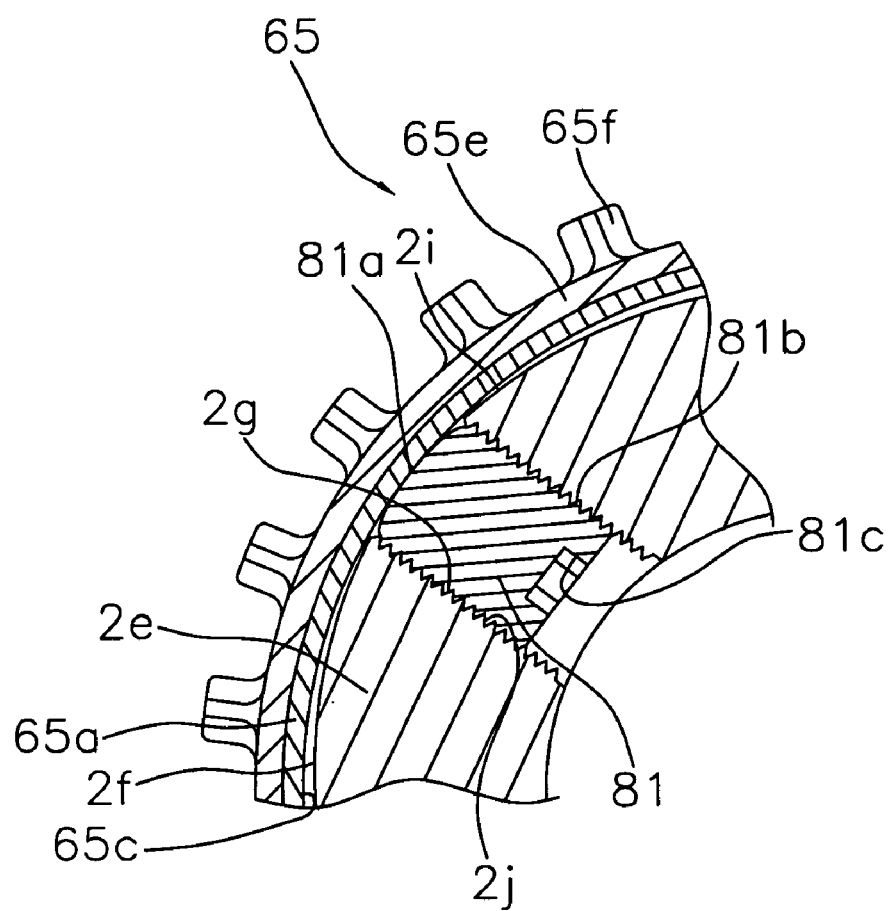
FIG. 17 is an enlarged lateral side partial cross-sectional view of a spinning reel in FIG. 1 with a rotor braking device in accordance with a fourth embodiment of the present invention.

Referring now to FIGS. 16 and 17, a spinning reel rotor braking device 354 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the first embodiment, the braking force of the braking member 65 is adjusted according to the number of the first and second projection members 81 and 82 that are mounted on the first and second concave portions 2g and 2h. In the fourth embodiment, a braking force of the braking member 65 of the rotor braking device 354 is adjusted when a first projection member 381 of a frictional force adjusting unit has a front end portion 381a with a different projection amount from that of the first projection member 81 of the first embodiment. In this configuration, the body member 65e and the first interposed member 65a are stretched outward according to the projection amount of the first projection member 381. Therefore, the braking force of the braking member 65 increases when the projection amount of the front end portion 381a of the first projection member 381 is set to be larger.

As shown in FIGS. 16 and 17, the first projection member 381 is a hexagon socket setscrew having a male threaded portion 381b on an outer periphery thereof and a hexagon socket 381c on a base end portion thereof. The male threaded portion 381b is selectively threaded into a female threaded portion 302j of a first concave portion 302g of the frictional force adjusting unit. Here, a jig with a hexagonal front end portion is interlocked with the hexagon socket 381c to rotate the first projection member 381. When the male threaded portion 38 1b of the first projection member 381 is threaded into the female threaded portion 302j of the first concave portion 302g, the first projection member 381 is able to be moved back and forth in an inner peripheral direction of the braking member 65. Referring to FIG. 16, when the front end portion 381a of the first projection member 381 does not contact an inner peripheral portion of the braking member 65, a gap 2i is not generated between the mounting groove 2f and the first interposed member 65a. Accordingly, the body member 65e and the first interposed member 65a are not stretched outward. Therefore, the pressure-contact force of the first interposed member 65a with respect to the mounting groove 2f gets smaller, and accordingly the braking force of the braking member 65 decreases. Referring to FIG. 17, when the front end portion 381a of the first projection member 381 contacts the inner peripheral portion of the braking member 65, the gap 2i is generated between the mounting groove 2f and the first interposed member 65a. Thus, the body member 65e and the first interposed member 65a are stretched outward. Therefore, the pressure-contact force of the first interposed member 65a with respect to the mounting groove 2f gets larger and accordingly, the braking force of the braking member 65 increases. In this configuration, the braking force of the braking member 65 is easily adjusted to a small braking force generated when the front end portion 381a of the first projection member 381 does not contact the inner peripheral portion of the braking member 65 (FIG. 16) or a large braking force generated when the front end portion 381a of the first projection member 381 contacts the inner peripheral portion of the braking member 65 (FIG. 17).

Fifth Embodiment

Figure 18:
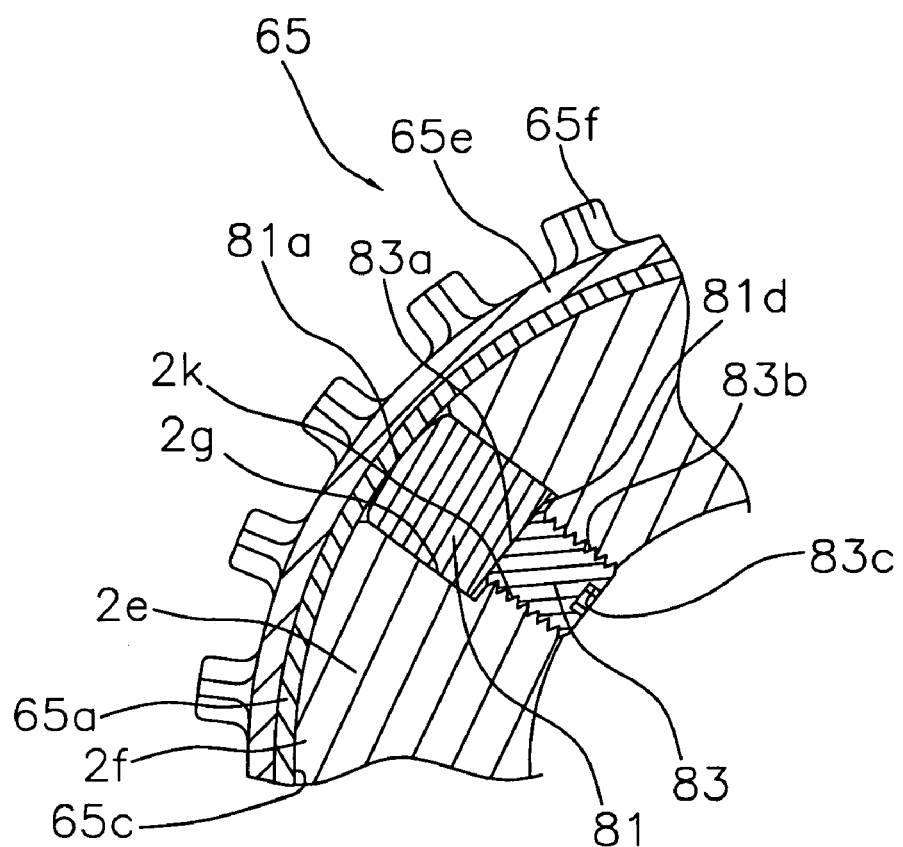
FIG. 18 is an enlarged lateral side partial cross-sectional view of a spinning reel in FIG. 1 with a rotor braking device in accordance with a fifth embodiment of the present invention.

Referring now to FIG. 18, a spinning reel rotor braking device 454 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

Figure 19:
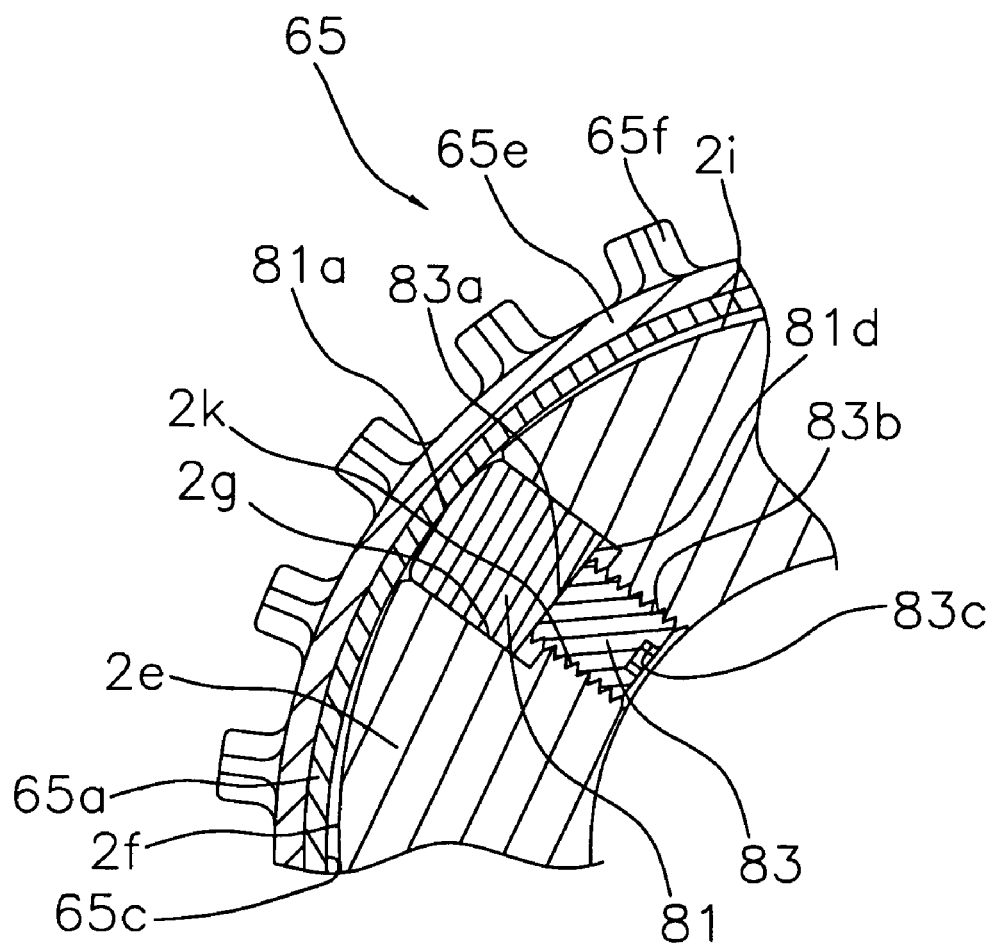
FIG. 19 is an enlarged lateral side partial cross-sectional view of a spinning reel in FIG. 1 with a rotor braking device in accordance with a fifth embodiment of the present invention.

As shown in FIGS. 18 and 19, the fifth embodiment is the same as the first embodiment except a first projection member 481 of a frictional force adjusting unit with a pushing member 483 is provided. The pushing member 483 pushes the first projection member 481 to the inner peripheral side of the braking member 65. The pushing member 483 includes a hexagon socket setscrew with a front end portion 483a that is able to contact a base end portion 481d of the first projection member 481, a male threaded portion 483b that is formed on an outer periphery thereof to selectively thread into a female threaded portion 402k and a hexagon socket 483c that is formed on a base end portion of the pushing member 483. The female threaded portion 402k is in communication with a base end side of a first concave portion 402g of the frictional force adjusting unit. Here, a jig with a hexagonal front end portion is interlocked with the hexagon socket 483c to rotate the pushing member 483. When the male threaded portion 483b is threaded into the female threaded portion 402k, the pushing member 483 is able to be moved back and forth in a direction of the base end portion 481d of the first projection member 81 to move the first projection member 481 in an inner peripheral direction of the braking member 65. Referring to FIG. 18, when the pushing member 483 is moved in the direction of the base end portion 481d of the first projection member 481 only a short distance, a front end portion 481a of the projection member 481 contacts the inner peripheral portion of the braking member 65 with a weak pushing force and a gap 2i is not generated between the mounting groove 2f and the first interposed member 65a. Therefore, the body member 65e and the first interposed member 65a are not stretched outward. Accordingly, the pressure-contact force of the first interposed member 65a with respect to the mounting groove 2f gets smaller and thus, the braking force of the braking member 65 decreases. Referring to FIG. 19, when the pushing member 483 is moved a long distance in the direction of the base end portion 481d of the first projection member 481 the front end portion 481a of the first projection member 481 contacts the inner peripheral portion of the braking member 65 with a strong pushing force and a gap 2i is generated between the mounting groove 2f and the first interposed member 65a. Accordingly, the body member 65e and the first interposed member 65a are stretched outward. Therefore, the pressure-contact force of the first interposed member 65a with respect to the mounting groove 2f gets larger and thus, the braking force of the braking member 65 increases. In this configuration, the braking force of the braking member 65 is easily adjusted to a small braking force generated when the front end portion 481a of the first projection member 481 contacts the inner periphery of the braking member 65 with the small pressure-contact force (FIG. 18) or a large braking force generated when the front end portion 481a of the first projection member 481 contacts the inner periphery of the braking member 65 with the strong pressure-contact force (FIG. 19).

Sixth Embodiment

Figure 20:
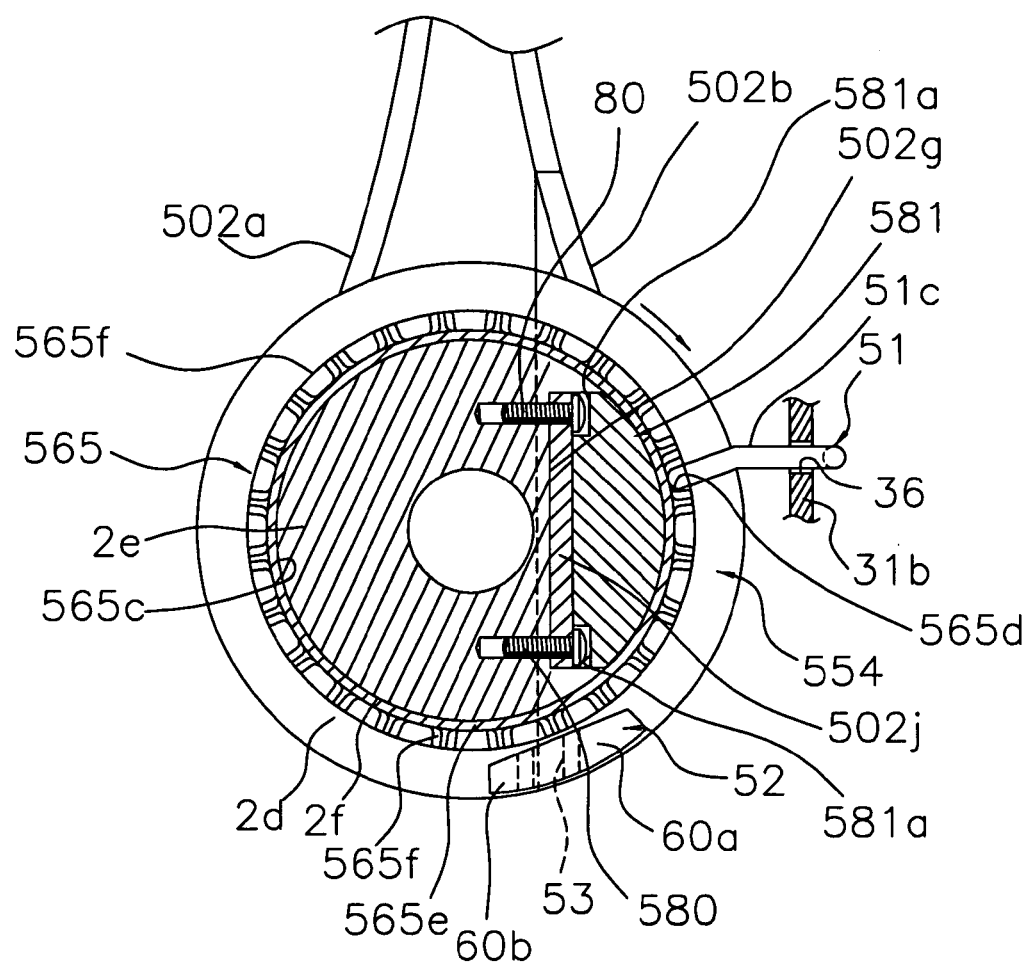
FIG. 20 is a plan view of a reel body of the spinning reel of FIG. 1 with a rotor braking device in accordance with a sixth embodiment of the present invention.

Referring now to FIG. 20, a spinning reel rotor braking device 554 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the first embodiment, the first and second projection members 81 and 82 are mounted on the first and second concave portions 2g and 2h. In the sixth embodiment, a projection member 581 of a frictional force adjusting unit is mounted on a concave portion 502g of the frictional force adjusting unit. The concave portion 502g is formed by evenly concaving from an arc-shaped portion. The concave portion 502g has a center angle of about 70-100 degrees toward the center, for example. A plate-like portion 502j that is unitarily formed with a front of a lid member 502b is disposed in the concave portion 502g. The plate-like portion 502j is for screw-fixing the front of the lid member 502b to the reel body 502a. The plate-like portion 502j is screw-fixed to the concave portion 502g with two fixing bolts 580.

The projection member 581 is mounted to the concave portion 502g so as to contact the plate-like portion 502j. A relief portion 581a is formed on the projection member 581 in order to prevent a head of the fixing bolt 580 from interposing. A braking force is adjusted by changing an amount of a projection of the projection member 581. Thus, the fixed part at the front of the lid member 502b cannot be exposed outside.

Figure 21:
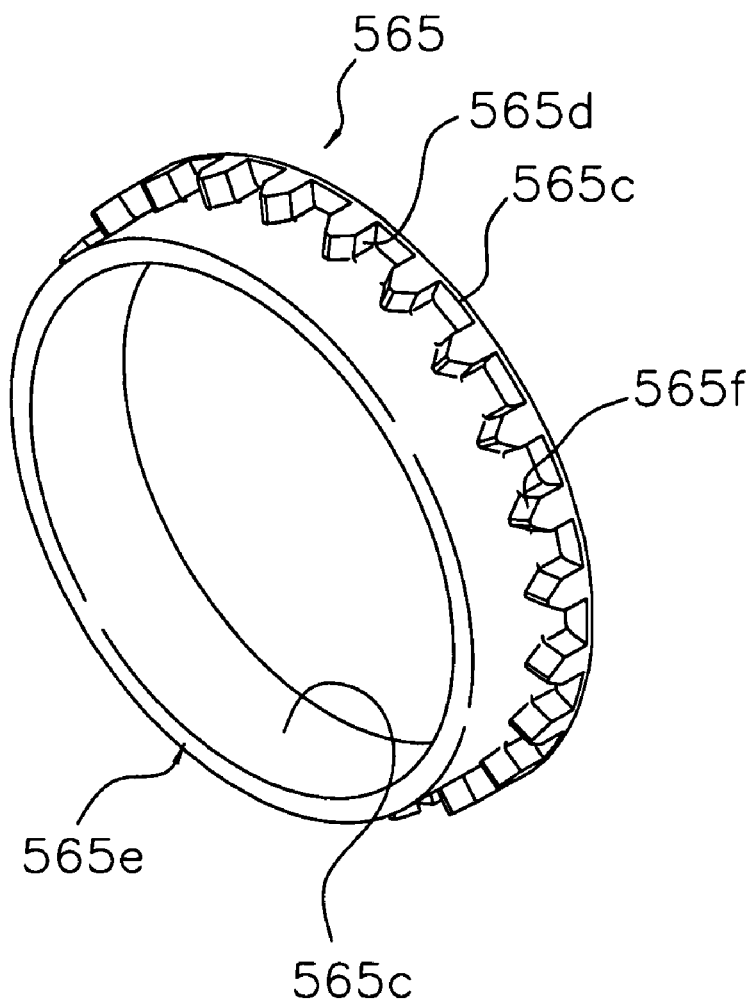
FIG. 21 is an oblique perspective view of a braking member of the rotor braking device of FIG. 20 in accordance with a sixth embodiment of the present invention.

In the sixth embodiment, as shown in FIG. 21, a braking member 565 of the rotor braking device 554 is mounted to the mounting groove 2f, which is, for example, an elastic structure that is made of urethane rubber or nitrile rubber, for example. Similar to the second embodiment, the braking member 565 has a drag portion 565c in an inner peripheral portion of a circular body member 565e. A coupling portion 565f is unitarily formed with two engaging portions 565d on the opposite side of being entered by the moving member 51. A plurality of engaging portions 565d is coupled with the coupling portion 565f. Thus, the elastic braking member 565 is not easily deformed at the time of braking when the moving member 51 is engaged by the engaging portion 565d.

In the aforementioned embodiments, a front drag spinning reel was explained as an example. However, the present invention can be applied to the bail tripping device of all types of spinning reels, such as a rear drag spinning reel or a lever brake spinning reel, that return a pivotable bail arm to the line-winding position.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rotor braking device of a spinning reel for braking a rotor that is rotatably mounted on a reel unit according to a pivot of a bail arm that pivots between a line-winding position and a line-releasing position, comprising:
- a moving member configured to be mounted in the rotor and arranged to move to a first position corresponding to the line-winding position and to a second position corresponding to the line-releasing position in association with the bail arm;
- a braking member that includes
  - an annular body member configured to be mounted on an outer periphery of a front end of the reel unit,
  - a drag portion formed in an inner peripheral side of the body member and configured to frictionally engage the reel unit to rotate relative thereto, and
  - a plurality of engaging portions formed in an outer peripheral side of the body member, the moving member engaging one of the engaging portions when the moving member is moved to the second position, the braking member frictionally sliding the drag portion with respect to the reel unit when the moving member engages with the engaging portions; and
- a frictional force adjusting unit configured to be disposed between the reel unit and the braking member and to adjust a frictional force generated when the drag portion frictionally slides with respect to the reel unit.

2. The rotor braking device according to claim 1, wherein the braking member is comprised of an annular synthetic resin with elasticity, and
the drag portion is mounted to the reel unit to be press-contacted thereto by the elasticity of the synthetic resin.

3. The rotor braking device according to claim 1, wherein the braking member includes first and second synthetic resin members, the first and second synthetic resin members are approximately semi-circular and include synthetic resin, and
the drag portion is configured to be mounted to the reel unit to be press-contacted to the reel unit by a spring member mounted in an annular groove formed in an outer periphery side of the body member.

4. The rotor braking device according to claim 1, wherein the frictional force adjusting unit adjusts an amount of the frictional force generated with the reel unit by changing relative positions of the reel unit and the braking member.

5. The rotor braking device according to claim 4, wherein the frictional force adjusting unit includes a concave portion configured to be at an outer periphery of a front end portion of the reel unit, and a projection member having a front end portion mounted on the concave portion to project outwardly, the projection member adjusts the frictional force generated when the front end portion of the projection member contacts an inner peripheral side of the braking member.

6. The rotor braking device according to claim 5, wherein the projection member is detachably/reattachably mounted on the concave portion.

7. The rotor braking device according to claim 5, wherein the projection member includes a male threaded portion that is selectively threaded into a female threaded portion formed in the concave member.

8. The rotor braking device according to claim 5, wherein the frictional force adjusting unit includes a pushing member that pushes the projection member toward an inner peripheral side of the braking member.

9. The rotor braking device according to claim 5, wherein the frictional force adjusting unit includes a plurality of the concave portions on which a plurality of the projection members is selectively mounted.

10. The rotor braking device according to claim 5, wherein the frictional force adjusting unit includes a plurality of the projection members, each of the projection members projects outwardly an amount that is different from each of the other front end portions.

11. The rotor braking device according to claim 1, wherein the braking member further includes an approximately cylindrical interposed member made of a synthetic resin with a small frictional resistance that is configured to be detachably/reattachably mounted between the reel unit and the body member.

12. The rotor braking device according to claim 11, wherein the interposed member includes first and second interposed members that are approximately semi-cylindrical synthetic resin members.

13. The rotor braking device according to claim 1, wherein the moving member is made of metal.

14. The rotor braking device according to claim 1, wherein the moving member projects a portion thereof toward the reel unit when positioned in the second position, and includes a projection portion that engages with the engaging portion of the braking member.

15. The rotor braking device according to claim 1, wherein the moving member is a rod shaped member with a front end that is bent toward a vicinity of a pivoting center of the bail arm such that the moving member extends along a pivot axis and rotatably engages with the bail arm and a rear end that is bent toward a rotational axis of the rotor, the moving member is configured to engage the rotor so as to be movable back and forth, and a portion between the front and rear ends of the moving member is disposed such that it extends along the rotational axis of the rotor.

16. A spinning reel, comprising:
- a handle;
- a reel unit rotatively supporting the handle;
- a rotor rotatively supported on a front of the reel unit and having a bail arm that pivots between a line-winding position and a line-releasing position;
- a spool disposed at a front of the rotor; and
- a rotor braking device rotatably mounted on the reel unit according to a pivot of the bail arm, the rotor braking device including
  - a moving member mounted in the rotor to move to a first position corresponding to the line-winding position and to a second position corresponding to the line-releasing position in association with the bail arm,
  - a braking member that includes an annular body member mounted on an outer periphery of a front end of the reel unit, a drag portion formed in an inner peripheral side of the body member to frictionally engage the reel unit to rotate relative thereto, and a plurality of engaging portions formed in an outer peripheral side of the body member, the moving member engaging one of the engaging portions when the moving member is moved to the second position, the braking member frictionally sliding the drag portion with respect to the reel unit when the moving member engages with the engaging portions, and a frictional force adjusting unit disposed between the reel unit and the braking member to adjust a frictional force generated when the drag portion frictionally slides with respect to the reel unit.

17. The spinning reel according to claim 16, wherein the braking member is comprised of an annular synthetic resin with elasticity, and the drag portion is mounted to the reel unit to be press-contacted thereto by the elasticity of the synthetic resin.

18. The spinning reel according to claim 16, wherein the braking member includes first and second synthetic resin members, the first and second synthetic resin members are approximately semi-circular and include synthetic resin, and the drag portion is mounted to the reel unit to be press-contacted to the reel unit by a spring member mounted in an annular groove formed in an outer periphery side of the body member.

19. The spinning reel according to claim 16, wherein the frictional force adjusting unit adjusts an amount of the frictional force generated with the reel unit by changing relative positions of the reel unit and the braking member.

20. The spinning reel according to claim 19, wherein the frictional force adjusting unit includes a concave portion at an outer periphery of a front end portion of the reel unit, and a projection member having a front end portion mounted on the concave portion to project outwardly, the projection member adjusts the frictional force generated when the front end portion of the projection member contacts an inner peripheral side of the braking member.

* * * * *